United States Patent
Ren et al.

(10) Patent No.: US 12,212,985 B2
(45) Date of Patent: Jan. 28, 2025

(54) SIGNAL PROCESSING METHOD, DEVICE AND COMMUNICATION DEVICE

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 506 days.

(21) Appl. No.: 17/607,821

(22) PCT Filed: Apr. 21, 2020

(86) PCT No.: PCT/CN2020/085827
§ 371 (c)(1),
(2) Date: Oct. 29, 2021

(87) PCT Pub. No.: WO2020/221061
PCT Pub. Date: Nov. 5, 2020

(65) Prior Publication Data
US 2022/0256373 A1    Aug. 11, 2022

(30) Foreign Application Priority Data
Apr. 30, 2019    (CN) .......................... 201910363911.3

(51) Int. Cl.
*H04W 24/08*    (2009.01)
*H04L 5/00*    (2006.01)
(Continued)

(52) U.S. Cl.
CPC ........... *H04W 24/08* (2013.01); *H04L 5/0048* (2013.01); *H04L 25/0226* (2013.01); *H04W 52/52* (2013.01); *H04L 2027/0026* (2013.01)

(58) Field of Classification Search
CPC ... H04L 5/0048; H04L 25/0226; H04W 52/52
(Continued)

(56) References Cited

U.S. PATENT DOCUMENTS

| 9,332,469 B2 | 5/2016 | Vladimirovich et al. |
| 2004/0242174 A1 | 12/2004 | Kim et al. |

(Continued)

FOREIGN PATENT DOCUMENTS

| CN | 101578833 A | 11/2009 |
| CN | 102237951 A | 11/2011 |

(Continued)

OTHER PUBLICATIONS

Partial Supplementary European Search Report for European Patent Application 20799254.6 issued on May 27, 2022.
(Continued)

*Primary Examiner* — Dang T Ton
(74) *Attorney, Agent, or Firm* — Ladas & Parry, LLP

(57) ABSTRACT

A signal processing method, a device and a communication device are provided. A signal processing method, applied to a first communication device and including: a first communication device sending a first reference signal to a second communication device; where the first reference signal is used for an automatic gain control measurement of at least two ports of the first reference signal and at least one of: a frequency offset estimation; a channel state information measurement; or a channel estimation.

21 Claims, 7 Drawing Sheets receiving a first reference signal sent by a first communication device — 31 performing, according to the first reference signal, an automatic gain control measurement of at least two ports of the first reference signal and at least one of: a frequency offset estimation; a channel state information measurement; or a channel estimation — 32

(51) Int. Cl.
*H04L 25/02* (2006.01)
*H04W 52/52* (2009.01)
*H04L 27/00* (2006.01)

(58) Field of Classification Search
USPC .................................. 370/329, 400, 403
See application file for complete search history.

(56) References Cited

U.S. PATENT DOCUMENTS

| | | | |
|---|---|---|---|
| 2010/0124294 | A1 | 5/2010 | Birru et al. |
| 2012/0120905 | A1 | 5/2012 | Ko |
| 2013/0017793 | A1* | 1/2013 | Henttonen ............ H04W 52/52 455/67.11 |
| 2017/0373743 | A1 | 12/2017 | Park et al. |
| 2018/0145857 | A1 | 5/2018 | Kim et al. |
| 2018/0176043 | A1 | 6/2018 | Kim et al. |
| 2018/0324733 | A1 | 11/2018 | Chae |
| 2019/0149301 | A1 | 5/2019 | Liu et al. |
| 2019/0173646 | A1 | 6/2019 | Wu et al. |
| 2019/0363777 | A1 | 11/2019 | Karjalainen et al. |
| 2020/0007297 | A1 | 1/2020 | Hong et al. |
| 2022/0295464 | A1* | 9/2022 | Ko ....................... H04W 72/044 |

FOREIGN PATENT DOCUMENTS

| | | |
|---|---|---|
| CN | 102474493 A | 5/2012 |
| CN | 103701730 A | 4/2014 |
| CN | 107623542 A | 1/2018 |
| CN | 109391403 A | 2/2019 |
| CN | 109644025 A | 4/2019 |
| CN | 111431678 A | 7/2020 |
| WO | 2018027982 A1 | 2/2018 |
| WO | 2018131922 A1 | 7/2018 |
| WO | 2018135905 A1 | 7/2018 |

OTHER PUBLICATIONS

"Feature lead summary #3 for agenda item 7.2.4.1.1 Physical layer structure," 3GPP TSG RAN WG1 #96, R1-1903769, Athens, Greece, Feb. 25-Mar. 1, 2019, Agenda Item: 7.2.4.1.1, Source: LG Electronics, all pages.
International Search Report for PCT Application PCT/CN2020/085827, issued Jul. 21, 2020 and its English Translation.
Written Opinion for PCT Application PCT/CN2020/085827, issued Jul. 21, 2020 and its English Translation.
First Office Action and search report for Chinese Patent Application 201910363911.3, issued Mar. 25, 2021 and its English Translation.
Second Office Action for Chinese Patent Application 201910363911.3, issued Nov. 2, 2021 and its English Translation.
First Office Action and search report for Taiwanese Patent Application 109114021, issued Dec. 7, 2020 and its English Translation.
"Discussion on physical layer structure for NR sidelink" 3GPP TSG RAN WG1 #96 R1-1901943, Athens, Greece, Feb. 25-Mar. 1, 2019 Agenda Item: 7.2.4.1.1 Source: Fujitsu.
"Discussion on physical layer structure in NR V2X" 3GPP TSG RAN WG1 #86 R1-1901992, Athens, Greece, Feb. 25-Mar. 1, 2019 Agenda Item: 7.2.4.1.1 Source: CATT.
Extended European Search Report for European Patent Application No. 20799254.6 issued by the European Patent Office on Oct. 5, 2022.
Office action from corresponding Korean Patent Application No. 10-2021-7039284 dated Aug. 12, 2024, and its English translation.
Ericsson, R1-1905475, "PHY layer structure for NR sidelink," 3GPP TSG RAN WG1 #96bis, Xi'an, China, Apr. 8-12, 2019, 3GPP server publication date (Apr. 2, 2019).
Huawei et al, R1-1903945, "Sidelink reference signal design for NR V2X," Xi'an, China, 3GPP TSG RAN WG1 #96bis, Apr. 8-12, 2019, 3GPP server publication date (Apr. 2, 2019).

* cited by examiner

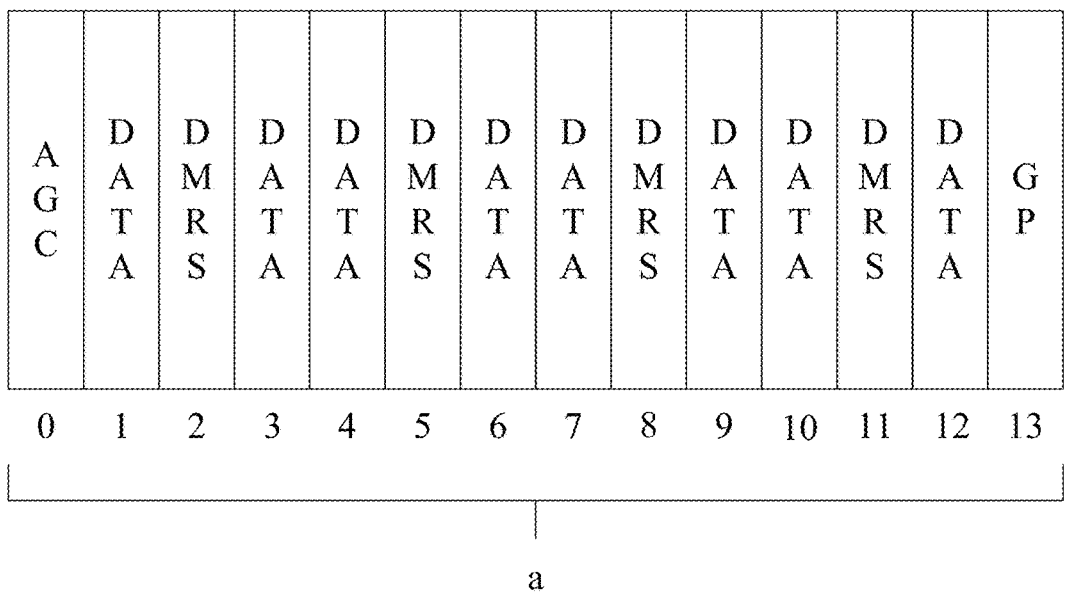

a

FIG. 1 sending a first reference signal to a second communication device, the first reference signal is used for an automatic gain control measurement of at least two ports of the first reference signal and at least one of: a frequency offset estimation; a channel state information measurement; or a channel estimation — 21

FIG. 2 receiving a first reference signal sent by a first communication device — 31 performing, according to the first reference signal, an automatic gain control measurement of at least two ports of the first reference signal and at least one of: a frequency offset estimation; a channel state information measurement; or a channel estimation — 32

FIG. 3

SIGNAL PROCESSING METHOD, DEVICE AND COMMUNICATION DEVICE

CROSS-REFERENCE TO RELATED APPLICATIONS

The present application is the U.S. national phase of PCT Application PCT/CN2020/085827 filed on Apr. 21, 2020, which claims a priority of Chinese patent application No. 201910363911.3 filed on Apr. 30, 2019, the disclosures of which is are incorporated herein by reference in their entireties.

TECHNICAL FIELD

The present disclosure relates to the field of communication technology, in particular to a signal processing method, device and communication device.

BACKGROUND

In the related art, in Long Term Evolution (LTE) Intelligent Vehicle-to-everything (V2X) technology (version Rel-14/Rel-15 LTE V2X technology), terminal (user equipment, UE), the time length used for automatic gain control or guard interval is fixed to one symbol to complete the adjustment of the signal power entering the analog-to-digital converter (ADC) and complete the conversion between sending and receiving. The demodulation reference signal (DMRS) used for data demodulation also occupies 4 symbols in one subframe, and the reference signal overhead is relatively high. With the emergence of the fifth generation (5G) new radio access technology (New Radio, NR), further development of the Internet of Vehicles technology is promoted to meet the needs of new application scenarios. 5GNR supports the configuration of flexible subcarrier spacing, which brings new challenges to the design of the NRV2X physical layer structure. The automatic gain control (AGC) and guard period (guard period) that originally occupied one symbol were fixed., GP), may not meet the demand, need to redesign. LTE V2X is a broadcast or multicast communication mode, and there is no unicast mode.

Specifically, as shown in FIG. 1 (a in the figure represents a subframe), the abscissa is the time domain, and each column represents an orthogonal frequency division multiplexing (OFDM) symbol. The ordinate is the frequency domain. AGC occupies the first OFDM symbol fixedly, and GP occupies the last OFDM symbol fixedly, with data or DMRS in the middle. It can be seen that in the 14 symbols of a subframe, AGC, GP, and DMRS occupy a total of 6 symbols, leaving only 8 symbols for data transmission. In NR V2X, in order to meet the requirements of NR V2X unicast communication, To support the newly introduced unicast communication mode between UE and UE, user-based multi-port resource occupancy awareness, automatic gain control, frequency offset estimation, channel measurement and channel estimation are required in NR V2X, that is, In other words, each user needs to use distinguishable signals or channels to complete functions such as automatic gain control, frequency offset estimation, and channel measurement. At the same time, it is also necessary to avoid performance degradation caused by collisions of these signals or channels between users. In this way, many new signals or channels need to be introduced to meet the above requirements, which increases the complexity and signaling overhead of the system design, and wastes the resources.

In other words, there is a problem of excessive resource consumption when supporting multiple functions in NR V2X multi-port direct link communication in the related art

SUMMARY

The purpose of the present disclosure is to provide a signal processing method, device, and communication device to solve the problem of excessive resource consumption when supporting multiple functions in NR V2X multi-port direct link communication in the related art.

In order to solve the above technical problems, a signal processing method applied to a first communication device is provided in an embodiment of the present disclosure provide, including:
  a sending a first reference signal to a second communication device;
  where the first reference signal is used for an automatic gain control measurement of at least two ports of the first reference signal and at least one of:
  a frequency offset estimation;
  a channel state information measurement; or
  a channel estimation.

Optionally, a sequence type of the first reference signal is a pseudo-random sequence or a constant amplitude zero auto-correlation sequence.

Optionally, the first reference signal occupies at least one symbol in a time domain.

Optionally, different ports of the first reference signal correspond to at least one of different sequences, different cyclic shifts, different time domain positions or different frequency domain positions.

Optionally, the first reference signal is mapped in time domain and/or frequency domain in a comb mapping manner, and is mapped to a preset working bandwidth.

Optionally, the first reference signal is mapped in time domain and/or frequency domain in a continuous mapping manner, and is mapped to a preset working bandwidth;
  where the continuous mapping manner is a mapping one by one according to subcarrier sequence numbers.

Optionally, the preset working bandwidth is one of an entire working bandwidth, part of a working bandwidth, an entire carrier bandwidth, part of a carrier bandwidth, or a configured bandwidth part BWP.

Optionally, the first reference signal is used for the automatic gain control measurement of the at least two ports of the first reference signal;
  the first reference signal is configured to, according to a signal strength of a sequence received by each port of the first reference signal, enable the second communication device to adjust a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

Optionally, the first reference signal is used for the frequency offset estimation of at least two ports of the first reference signal, where the first reference signal is used for:
  enabling the second communication device to obtain an initial frequency offset estimation value corresponding to each port of the first reference signal;
  according to the initial frequency offset estimation value and at least one frequency offset adjustment value corresponding to each port, obtaining at least two frequency offset trial values corresponding to each port; and performing a frequency offset compensation on the sequence received by each port according to the at least two frequency offset trial values corresponding to each port.

Optionally, the obtaining the initial frequency offset estimation value corresponding to each port of the first reference signal includes:

dividing the sequence received by each port of the first reference signal into two sequences, and performing a correlation processing on the two sequences with a local sequence corresponding to a corresponding port respectively;

obtaining a phase difference value between the two sequences after the correlation processing; and obtaining the initial frequency offset estimation value corresponding to the corresponding port according to the phase difference value.

Optionally, the performing the frequency offset compensation on the sequence received by each port according to the at least two frequency offset trial values corresponding to each port includes:

performing a correlation calculations according to the at least two frequency offset trial values corresponding to each port, to obtain at least two correlation peaks corresponding to each port;

obtaining a frequency offset trial value corresponding to a maximum value of the at least two correlation peaks corresponding to each port as an optimal frequency offset trial value corresponding to each port; and performing the frequency offset compensation on the sequence received by each port according to the optimal frequency offset trial value corresponding to each port.

Optionally, the first reference signal is used for the channel state information measurement of the at least two ports of the first reference signal, where the first reference signal is configured to enable the second communication device to perform the channel state information measurement on the at least two ports of the first reference signal according to the first reference signal, to obtain a channel state information measurement result of the at least two ports of the first reference signal.

Optionally, the first reference signal is configured to enable the second communication device to perform the channel state information measurement on the at least two ports of the first reference signal according to the first reference signal, to obtain a channel state information measurement result of the at least two ports of the first reference signal, where different ports of the reference signal correspond to different time domain positions, to enable the second communication device to obtain the channel state information measurement result of each port according to the time domain position corresponding to each port of the reference signal; and/or different ports of the reference signal correspond to different frequency domain positions, to enable the second communication device to obtain the channel state information measurement result of each port according to the frequency domain position corresponding to each port of the reference signal; and/or different ports of the reference signal correspond to different sequences, to enable the second communication device to obtain the channel state information measurement result of each port according to the sequence corresponding to each port of the reference signal; and/or different ports of the reference signal correspond to different cyclic shifts, to enable the second communication device to obtain the channel state information measurement result of each port according to the cyclic shift corresponding to each port of the reference signal.

Optionally, the first reference signal is used for the channel estimation of the at least two ports of the first reference signal, where the first reference signal is configured to enable the second communication device to perform the channel estimation of the at least two ports of the first reference signal according to the first reference signal, or to enable the second communication device to perform the channel estimation of the at least two ports of the first reference signal according to the first reference signal and a newly added demodulation reference signal DMRS.

A signal processing method is further provided in an embodiment of the present disclosure, applied to a second communication device and including:

receiving a first reference signal sent by a first communication device;

performing, according to the first reference signal, an automatic gain control measurement of at least two ports of the first reference signal and at least one of:

a frequency offset estimation;

a channel state information measurement; or a channel estimation.

Optionally, a sequence type of the first reference signal is a pseudo-random sequence or a constant amplitude zero auto-correlation sequence.

Optionally, the first reference signal occupies at least one symbol in a time domain.

Optionally, different ports of the first reference signal correspond to at least one of different sequences, different cyclic shifts, different time domain positions or different frequency domain positions.

Optionally, the first reference signal is mapped in time domain and/or frequency domain in a comb mapping manner, and is mapped to a preset working bandwidth.

Optionally, the first reference signal is mapped in time domain and/or frequency domain in a continuous mapping manner, and is mapped to a preset working bandwidth;

where the continuous mapping manner is a mapping one by one according to subcarrier sequence numbers.

Optionally, the preset working bandwidth is one of an entire working bandwidth, part of a working bandwidth, an entire carrier bandwidth, part of a carrier bandwidth, or a configured bandwidth part BWP.

Optionally, the performing, according to the first reference signal, the automatic gain control measurement of the at least two ports of the first reference signal, includes:

according to a signal strength of a sequence received by each port of the first reference signal, adjusting a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

Optionally, the performing, according to the first reference signal, the automatic gain control measurement of the at least two ports of the first reference signal, includes:
in a case that a subcarrier interval SCS of a carrier communicating on a current direct link is smaller than a first preset threshold, performing the automatic gain control measurement for each port of the first reference signal by using the first reference signal with one symbol or a half of symbol; or
in a case that a subcarrier interval SCS of a carrier communicating on a current direct link is larger than a first preset threshold, performing the automatic gain control measurement for each port of the first reference signal by using the first reference signal with at least two symbols;
where different ports correspond to different gain compensation amounts.

Optionally, in a case that the automatic gain control measurement for each port of the first reference signal is performed by using the first reference signal with a half of symbol, the method further includes:
for each port of the first reference signal, performing other operations excepting the automatic gain control measurement, by using the first reference signal corresponding to a remaining half of symbol.

Optionally, the performing, according to the first reference signal, the frequency offset estimation of the at least two ports of the first reference signal and at least one of includes:
obtaining an initial frequency offset estimation value corresponding to each port of the first reference signal;
according to the initial frequency offset estimation value and at least one frequency offset adjustment value corresponding to each port, obtaining at least two frequency offset trial values corresponding to each port; and
performing a frequency offset compensation on the sequence received by each port according to the at least two frequency offset trial values corresponding to each port.

Optionally, the obtaining the initial frequency offset estimation value corresponding to each port of the first reference signal includes:
dividing the sequence received by each port of the first reference signal into two sequences, and performing a correlation processing on the two sequences with a local sequence corresponding to a corresponding port respectively;
obtaining a phase difference value between the two sequences after the correlation processing; and
obtaining the initial frequency offset estimation value corresponding to the corresponding port according to the phase difference value.

Optionally, the performing the frequency offset compensation on the sequence received by each port according to at least two frequency offset trial values corresponding to each port includes:
performing a correlation calculations according to the at least two frequency offset trial values corresponding to each port, to obtain at least two correlation peaks corresponding to each port;
obtaining a frequency offset trial value corresponding to a maximum value of the at least two correlation peaks corresponding to each port as an optimal frequency offset trial value corresponding to each port; and
performing the frequency offset compensation on the sequence received by each port according to the optimal frequency offset trial value corresponding to each port.

Optionally, the performing, according to the first reference signal, the channel state information measurement of the at least two ports of the first reference signal includes:
performing, according to the first reference signal, the channel state information measurement of the at least two ports of the first reference signal, to obtain a channel state information measurement result of the at least two ports of the first reference signal.

Optionally, the performing, according to the first reference signal, the channel state information measurement of the at least two ports of the first reference signal to obtain the channel state information measurement result of the at least two ports of the first reference signal, includes:
in a case that different ports of the reference signal correspond to different time domain positions, obtaining the channel state information measurement result of each port according to the time domain position corresponding to each port of the reference signal; and/or
in a case that different ports of the reference signal correspond to different frequency domain positions, obtaining the channel state information measurement result of each port according to the frequency domain position corresponding to each port of the reference signal; and/or
in a case that different ports of the reference signal correspond to different sequences, obtaining the channel state information measurement result of each port according to the sequence corresponding to each port of the reference signal; and/or
in a case that different ports of the reference signal correspond to different cyclic shifts, obtaining the channel state information measurement result of each port according to the cyclic shift corresponding to each port of the reference signal.

Optionally, the performing, according to the first reference signal, the channel estimation of the at least two ports of the first reference signal includes:
performing the channel estimation of the at least two ports of the first reference signal according to the first reference signal, or
performing the channel estimation of the at least two ports of the first reference signal according to the first reference signal and a newly added demodulation reference signal DMRS.

Optionally, the performing, according to the first reference signal, the channel estimation of the at least two ports of the first reference signal includes:
in a case that a subcarrier interval SCS of a carrier communicating on a current direct link is smaller than a second preset threshold, performing the channel estimation of each port according to the sequence received by each port of the first reference signal.

Optionally, the performing the channel estimation of the at least two ports of the first reference signal according to the first reference signal and the newly added demodulation reference signal DMRS includes:
in a case that the SCS of the carrier communicating on the current direct link is larger than or equal to the second preset threshold, performing the channel estimation each port according to the sequence received by each port of the first reference signal and the corresponding newly added demodulation reference signal DMRS.

A communication device is further provided in an embodiment of the present disclosure, the communication device is a first communication device and including a memory, a processor, a transceiver, and a computer program stored in the memory and executable on the processor, where the processor executes the computer program to perform:

sending a first reference signal to a second communication device through the transceiver;
where the first reference signal is used for an automatic gain control measurement of at least two ports of the first reference signal and at least one of:
a frequency offset estimation;
a channel state information measurement; or
a channel estimation.

Optionally, a sequence type of the first reference signal is a pseudo-random sequence or a constant amplitude zero auto-correlation sequence.

Optionally, the first reference signal occupies at least one symbol in a time domain.

Optionally, different ports of the first reference signal correspond to at least one of different sequences, different cyclic shifts, different time domain positions or different frequency domain positions.

Optionally, the first reference signal is mapped in time domain and/or frequency domain in a comb mapping manner, and is mapped to a preset working bandwidth.

Optionally, the first reference signal is mapped in time domain and/or frequency domain in a continuous mapping manner, and is mapped to a preset working bandwidth;
where the continuous mapping manner is a mapping one by one according to subcarrier sequence numbers.

Optionally, the preset working bandwidth is one of an entire working bandwidth, part of a working bandwidth, an entire carrier bandwidth, part of a carrier bandwidth, or a configured bandwidth part BWP.

Optionally, the first reference signal is used for the automatic gain control measurement of the at least two ports of the first reference signal;
the first reference signal is configured to, according to a signal strength of a sequence received by each port of the first reference signal, enable the second communication device to adjust a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

Optionally, the first reference signal is used for the frequency offset estimation of at least two ports of the first reference signal, where the first reference signal is used for:
enabling the second communication device to obtain an initial frequency offset estimation value corresponding to each port of the first reference signal;
according to the initial frequency offset estimation value and at least one frequency offset adjustment value corresponding to each port, obtaining at least two frequency offset trial values corresponding to each port; and
performing a frequency offset compensation on the sequence received by each port according to the at least two frequency offset trial values corresponding to each port.

Optionally, he obtaining the initial frequency offset estimation value corresponding to each port of the first reference signal includes:

dividing the sequence received by each port of the first reference signal into two sequences, and performing a correlation processing on the two sequences with a local sequence corresponding to a corresponding port respectively;
obtaining a phase difference value between the two sequences after the correlation processing; and
obtaining the initial frequency offset estimation value corresponding to the corresponding port according to the phase difference value.

Optionally, the performing the frequency offset compensation on the sequence received by each port according to the at least two frequency offset trial values corresponding to each port includes:
performing a correlation calculations according to the at least two frequency offset trial values corresponding to each port, to obtain at least two correlation peaks corresponding to each port;
obtaining a frequency offset trial value corresponding to a maximum value of the at least two correlation peaks corresponding to each port as an optimal frequency offset trial value corresponding to each port; and
performing the frequency offset compensation on the sequence received by each port according to the optimal frequency offset trial value corresponding to each port.

Optionally, the first reference signal is used for the channel state information measurement of the at least two ports of the first reference signal, where
the first reference signal is configured to enable the second communication device to perform the channel state information measurement on the at least two ports of the first reference signal according to the first reference signal, to obtain a channel state information measurement result of the at least two ports of the first reference signal.

Optionally, the first reference signal is configured to enable the second communication device to perform the channel state information measurement on the at least two ports of the first reference signal according to the first reference signal, to obtain a channel state information measurement result of the at least two ports of the first reference signal, where
different ports of the reference signal correspond to different time domain positions, to enable the second communication device to obtain the channel state information measurement result of each port according to the time domain position corresponding to each port of the reference signal; and/or
different ports of the reference signal correspond to different frequency domain positions, to enable the second communication device to obtain the channel state information measurement result of each port according to the frequency domain position corresponding to each port of the reference signal; and/or
different ports of the reference signal correspond to different sequences, to enable the second communication device to obtain the channel state information measurement result of each port according to the sequence corresponding to each port of the reference signal; and/or
different ports of the reference signal correspond to different cyclic shifts, to enable the second communication device to obtain the channel state information measurement result of each port according to the cyclic shift corresponding to each port of the reference signal.

Optionally, the first reference signal is used for the channel estimation of the at least two ports of the first reference signal, where the first reference signal is configured to enable the second communication device to perform the channel estimation of the at least two ports of the first reference signal according to the first reference signal, or to enable the second communication device to perform the channel estimation of the at least two ports of the first reference signal according to the first reference signal and a newly added demodulation reference signal DMRS.

A communication device is further provided in an embodiment of the present disclosure, the communication device is a second communication device and including a memory, a processor, a transceiver, and a computer program stored in the memory and executable on the processor; the processor executes the computer program to perform:

receiving a first reference signal sent by a first communication device;
performing, according to the first reference signal, an automatic gain control measurement of at least two ports of the first reference signal and at least one of:
a frequency offset estimation;
a channel state information measurement; or
a channel estimation.

Optionally, a sequence type of the first reference signal is a pseudo-random sequence or a constant amplitude zero auto-correlation sequence.

Optionally, the first reference signal occupies at least one symbol in a time domain.

Optionally, different ports of the first reference signal correspond to at least one of different sequences, different cyclic shifts, different time domain positions or different frequency domain positions.

Optionally, the first reference signal is mapped in time domain and/or frequency domain in a comb mapping manner, and is mapped to a preset working bandwidth.

Optionally, the first reference signal is mapped in time domain and/or frequency domain in a continuous mapping manner, and is mapped to a preset working bandwidth;

where the continuous mapping manner is a mapping one by one according to subcarrier sequence numbers.

Optionally, the preset working bandwidth is one of an entire working bandwidth, part of a working bandwidth, an entire carrier bandwidth, part of a carrier bandwidth, or a configured bandwidth part BWP.

Optionally, the processor is configured to:
according to a signal strength of a sequence received by each port of the first reference signal, adjust a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

Optionally, the processor is configured to:
in a case that a subcarrier interval SCS of a carrier communicating on a current direct link is smaller than a first preset threshold, perform the automatic gain control measurement for each port of the first reference signal by using the first reference signal with one symbol or a half of symbol; or
in a case that a subcarrier interval SCS of a carrier communicating on a current direct link is larger than a first preset threshold, perform the automatic gain control measurement for each port of the first reference signal by using the first reference signal with at least two symbols;
where different ports correspond to different gain compensation amounts.

Optionally, in a case that the automatic gain control measurement for each port of the first reference signal is performed by using the first reference signal with a half of symbol, the method further includes:
for each port of the first reference signal, performing other operations excepting the automatic gain control measurement, by using the first reference signal corresponding to a remaining half of symbol.

Optionally, the processor is configured to:
obtain an initial frequency offset estimation value corresponding to each port of the first reference signal;
according to the initial frequency offset estimation value and at least one frequency offset adjustment value corresponding to each port, obtain at least two frequency offset trial values corresponding to each port; and
perform a frequency offset compensation on the sequence received by each port according to the at least two frequency offset trial values corresponding to each port.

Optionally, the processor is configured to:
divide the sequence received by each port of the first reference signal into two sequences, and performing a correlation processing on the two sequences with a local sequence corresponding to a corresponding port respectively;
obtain a phase difference value between the two sequences after the correlation processing; and
obtain the initial frequency offset estimation value corresponding to the corresponding port according to the phase difference value.

Optionally, the processor is configured to:
perform a correlation calculations according to the at least two frequency offset trial values corresponding to each port, to obtain at least two correlation peaks corresponding to each port;
obtain a frequency offset trial value corresponding to a maximum value of the at least two correlation peaks corresponding to each port as an optimal frequency offset trial value corresponding to each port; and
perform the frequency offset compensation on the sequence received by each port according to the optimal frequency offset trial value corresponding to each port.

Optionally, the processor is configured to:
perform, according to the first reference signal, the channel state information measurement of the at least two ports of the first reference signal, to obtain a channel state information measurement result of the at least two ports of the first reference signal.

Optionally, the processor is configured to:
in a case that different ports of the reference signal correspond to different time domain positions, obtain the channel state information measurement result of each port according to the time domain position corresponding to each port of the reference signal; and/or
in a case that different ports of the reference signal correspond to different frequency domain positions, obtain the channel state information measurement result of each port according to the frequency domain position corresponding to each port of the reference signal; and/or in a case that different ports of the reference signal correspond to different sequences, obtain the channel state information measurement result of each port according to the sequence corresponding to each port of the reference signal; and/or in a case that different ports of the reference signal correspond to different cyclic shifts, obtain the channel state information measurement result of each port according to the cyclic shift corresponding to each port of the reference signal.

Optionally, the processor is configured to:

perform the channel estimation of the at least two ports of the first reference signal according to the first reference signal, or perform the channel estimation of the at least two ports of the first reference signal according to the first reference signal and a newly added demodulation reference signal DMRS.

Optionally, the processor is configured to:

in a case that a subcarrier interval SCS of a carrier communicating on a current direct link is smaller than a second preset threshold, perform the channel estimation of each port according to the sequence received by each port of the first reference signal.

Optionally, the processor is configured to:

in a case that the SCS of the carrier communicating on the current direct link is larger than or equal to the second preset threshold, perform the channel estimation each port according to the sequence received by each port of the first reference signal and the corresponding newly added demodulation reference signal DMRS.

A computer-readable storage medium storing a computer program is further provided in an embodiment of the present disclosure, where the computer program is executed by a processor to perform the signal processing method at the above first communication device; or the computer program is executed by a processor to perform the signal processing method at the above second communication device.

A signal processing device applied to a first communication device is further provided in an embodiment of the present disclosure, including:

a first sending module, configured to send a first reference signal to a second communication device;

where the first reference signal is used for an automatic gain control measurement of at least two ports of the first reference signal and at least one of:

a frequency offset estimation;

a channel state information measurement; or a channel estimation.

Optionally, a sequence type of the first reference signal is a pseudo-random sequence or a constant amplitude zero auto-correlation sequence.

Optionally, the first reference signal occupies at least one symbol in a time domain.

Optionally, different ports of the first reference signal correspond to at least one of different sequences, different cyclic shifts, different time domain positions or different frequency domain positions.

Optionally, the first reference signal is mapped in time domain and/or frequency domain in a comb mapping manner, and is mapped to a preset working bandwidth.

Optionally, the first reference signal is mapped in time domain and/or frequency domain in a continuous mapping manner, and is mapped to a preset working bandwidth;

where the continuous mapping manner is a mapping one by one according to subcarrier sequence numbers.

Optionally, the preset working bandwidth is one of an entire working bandwidth, part of a working bandwidth, an entire carrier bandwidth, part of a carrier bandwidth, or a configured bandwidth part BWP.

Optionally, the first reference signal is used for the automatic gain control measurement of the at least two ports of the first reference signal;

the first reference signal is configured to, according to a signal strength of a sequence received by each port of the first reference signal, enable the second communication device to adjust a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

Optionally, the first reference signal is used for the frequency offset estimation of at least two ports of the first reference signal, where the first reference signal is used for:

enabling the second communication device to obtain an initial frequency offset estimation value corresponding to each port of the first reference signal;

according to the initial frequency offset estimation value and at least one frequency offset adjustment value corresponding to each port, obtaining at least two frequency offset trial values corresponding to each port; and performing a frequency offset compensation on the sequence received by each port according to the at least two frequency offset trial values corresponding to each port.

Optionally, the obtaining the initial frequency offset estimation value corresponding to each port of the first reference signal includes:

dividing the sequence received by each port of the first reference signal into two sequences, and performing a correlation processing on the two sequences with a local sequence corresponding to a corresponding port respectively;

obtaining a phase difference value between the two sequences after the correlation processing; and obtaining the initial frequency offset estimation value corresponding to the corresponding port according to the phase difference value.

Optionally, the performing the frequency offset compensation on the sequence received by each port according to the at least two frequency offset trial values corresponding to each port includes:

performing a correlation calculations according to the at least two frequency offset trial values corresponding to each port, to obtain at least two correlation peaks corresponding to each port;

obtaining a frequency offset trial value corresponding to a maximum value of the at least two correlation peaks corresponding to each port as an optimal frequency offset trial value corresponding to each port; and performing the frequency offset compensation on the sequence received by each port according to the optimal frequency offset trial value corresponding to each port.

Optionally, the first reference signal is used for the channel state information measurement of the at least two ports of the first reference signal, where the first reference signal is configured to enable the second communication device to perform the channel state information measurement on the at least two ports of the first reference signal according to the first reference signal, to obtain a channel state information measurement result of the at least two ports of the first reference signal.

Optionally, the first reference signal is configured to enable the second communication device to perform the channel state information measurement on the at least two ports of the first reference signal according to the first reference signal, to obtain a channel state information measurement result of the at least two ports of the first reference signal, where
- different ports of the reference signal correspond to different time domain positions, to enable the second communication device to obtain the channel state information measurement result of each port according to the time domain position corresponding to each port of the reference signal; and/or
- different ports of the reference signal correspond to different frequency domain positions, to enable the second communication device to obtain the channel state information measurement result of each port according to the frequency domain position corresponding to each port of the reference signal; and/or
- different ports of the reference signal correspond to different sequences, to enable the second communication device to obtain the channel state information measurement result of each port according to the sequence corresponding to each port of the reference signal; and/or
- different ports of the reference signal correspond to different cyclic shifts, to enable the second communication device to obtain the channel state information measurement result of each port according to the cyclic shift corresponding to each port of the reference signal.

Optionally, the first reference signal is used for the channel estimation of the at least two ports of the first reference signal, where
  the first reference signal is configured to enable the second communication device to perform the channel estimation of the at least two ports of the first reference signal according to the first reference signal, or to enable the second communication device to perform the channel estimation of the at least two ports of the first reference signal according to the first reference signal and a newly added demodulation reference signal DMRS.

A signal processing device applied to a second communication device is further provided in an embodiment of the present disclosure, including:
- a first receiving module is configured to receive a first reference signal sent by a first communication device;
- a first processing module, configured to perform, according to the first reference signal, an automatic gain control measurement of at least two ports of the first reference signal and at least one of:
  - a frequency offset estimation;
  - a channel state information measurement; or
  - a channel estimation.

Optionally, a sequence type of the first reference signal is a pseudo-random sequence or a constant amplitude zero auto-correlation sequence.

Optionally, the first reference signal occupies at least one symbol in a time domain.

Optionally, different ports of the first reference signal correspond to at least one of different sequences, different cyclic shifts, different time domain positions or different frequency domain positions.

Optionally, the first reference signal is mapped in time domain and/or frequency domain in a comb mapping manner, and is mapped to a preset working bandwidth.

Optionally, the first reference signal is mapped in time domain and/or frequency domain in a continuous mapping manner, and is mapped to a preset working bandwidth;
  where the continuous mapping manner is a mapping one by one according to subcarrier sequence numbers.

Optionally, the preset working bandwidth is one of an entire working bandwidth, part of a working bandwidth, an entire carrier bandwidth, part of a carrier bandwidth, or a configured bandwidth part BWP.

Optionally, the first processing module includes:
  a first processing sub-module, configured to, according to a signal strength of a sequence received by each port of the first reference signal, adjust a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

Optionally, the first processing module includes:
  a second processing sub-module, configured to, in a case that a subcarrier interval SCS of a carrier communicating on a current direct link is smaller than a first preset threshold, perform the automatic gain control measurement for each port of the first reference signal by using the first reference signal with one symbol or a half of symbol; or
  in a case that a subcarrier interval SCS of a carrier communicating on a current direct link is larger than a first preset threshold, perform the automatic gain control measurement for each port of the first reference signal by using the first reference signal with at least two symbols;
  where different ports correspond to different gain compensation amounts.

Optionally, the signal processing device further includes:
  a second processing module, configured to, for each port of the first reference signal, perform other operations excepting the automatic gain control measurement, by using the first reference signal corresponding to a remaining half of symbol.

Optionally, the first processing module includes:
  a first obtaining sub-module, configured to obtain an initial frequency offset estimation value corresponding to each port of the first reference signal;
  a third processing sub-module, configured to, according to the initial frequency offset estimation value and at least one frequency offset adjustment value corresponding to each port, obtain at least two frequency offset trial values corresponding to each port; and
  a fourth processing sub-module, configured to perform a frequency offset compensation on the sequence received by each port according to the at least two frequency offset trial values corresponding to each port.

Optionally, the first obtaining sub-module includes:
  a first processing unit, configured to divide the sequence received by each port of the first reference signal into two sequences, and performing a correlation processing on the two sequences with a local sequence corresponding to a corresponding port respectively;
  a first obtaining unit, configured to obtain a phase difference value between the two sequences after the correlation processing; and a second processing unit, configured to obtain the initial frequency offset estimation value corresponding to the corresponding port according to the phase difference value.

Optionally, the fourth processing sub-module includes:

a third processing unit, configured to perform a correlation calculations according to the at least two frequency offset trial values corresponding to each port, to obtain at least two correlation peaks corresponding to each port;

a second obtaining unit, configured to obtain a frequency offset trial value corresponding to a maximum value of the at least two correlation peaks corresponding to each port as an optimal frequency offset trial value corresponding to each port; and a fourth processing unit, configured to perform the frequency offset compensation on the sequence received by each port according to the optimal frequency offset trial value corresponding to each port.

Optionally, the first processing module includes:

a fifth processing sub-module, configured to perform, according to the first reference signal, the channel state information measurement of the at least two ports of the first reference signal, to obtain a channel state information measurement result of the at least two ports of the first reference signal.

Optionally, the fifth processing sub-module includes:

a fifth processing unit, configured to, in a case that different ports of the reference signal correspond to different time domain positions, obtain the channel state information measurement result of each port according to the time domain position corresponding to each port of the reference signal; and/or in a case that different ports of the reference signal correspond to different frequency domain positions, obtain the channel state information measurement result of each port according to the frequency domain position corresponding to each port of the reference signal; and/or in a case that different ports of the reference signal correspond to different sequences, obtain the channel state information measurement result of each port according to the sequence corresponding to each port of the reference signal; and/or in a case that different ports of the reference signal correspond to different cyclic shifts, obtain the channel state information measurement result of each port according to the cyclic shift corresponding to each port of the reference signal.

Optionally, the first processing module includes:

a sixth processing sub-module, configured to perform the channel estimation of the at least two ports of the first reference signal according to the first reference signal, or perform the channel estimation of the at least two ports of the first reference signal according to the first reference signal and a newly added demodulation reference signal DMRS.

Optionally, the sixth processing sub-module includes:

a sixth processing unit, configured to, in a case that a subcarrier interval SCS of a carrier communicating on a current direct link is smaller than a second preset threshold, perform the channel estimation of each port according to the sequence received by each port of the first reference signal.

Optionally, the sixth processing sub-module includes:

a seventh processing unit, in a case that the SCS of the carrier communicating on the current direct link is larger than or equal to the second preset threshold, perform the channel estimation each port according to the sequence received by each port of the first reference signal and the corresponding newly added demodulation reference signal DMRS.

The beneficial effects of the above technical solutions of the present disclosure are as follows:

According to the signal processing method in the present disclosure, a first reference signal is transmitted to a second communication device; where the first reference signal is used for an automatic gain control measurement of at least two ports of the first reference signal and at least one of: a frequency offset estimation; a channel state information measurement; or a channel estimation. It is able to enable the sending end to send multi-port multi-purpose reference signal (multi-purpose reference signal, MP-RS), the signal supports at least two ports, which can complete multi-port automatic gain control measurement by using a single signal, and at the same time have multi-port frequency offset estimation, multi-port channel state information measurement, multi-port channel estimation and other functions, thereby supporting multi-port and avoiding time-frequency resource waste, improving the bit error rate performance and resource utilization performance of the sidelink data transmission of the direct link, solving the problem of excessive resource consumption when supporting multiple functions in the NR V2X multi-port direct link communication in the related art.

BRIEF DESCRIPTION OF THE DRAWINGS

FIG. 1 is a schematic diagram of the R15 (version 15) V2X Sidelink subframe structure in related art;

FIG. 2 is a first schematic flow chart of a signal processing method according to an embodiment of the disclosure;

FIG. 3 is a second schematic flow chart of a signal processing method according to an embodiment of the disclosure;

DETAILED DESCRIPTION

Figure 4:
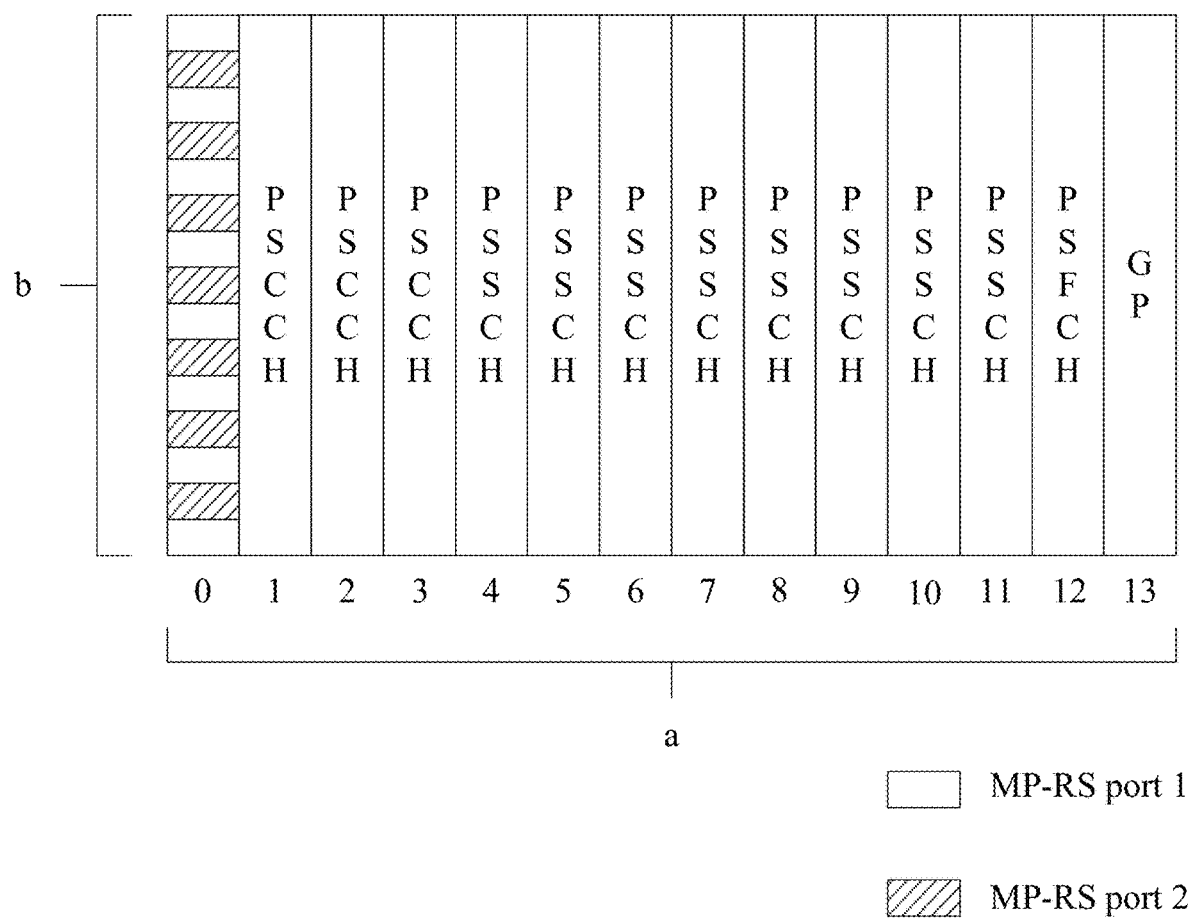
FIG. 4 is a first schematic diagram of multi-port MP-RS transmission according to an embodiment of the disclosure.

In order to make the technical problems, technical solutions, and advantages to be solved by the present disclosure clearer, a detailed description will be given below in conjunction with the accompanying drawings and specific embodiments.

Aiming at the problem of excessive resource consumption when supporting multiple functions in NR V2X multi-port direct link communication in the related art, the present disclosure provides a signal processing method applied to the first communication device, as shown in FIG. 2, including:

Step 21: sending a first reference signal to a second communication device;

the first reference signal is used for an automatic gain control measurement of at least two ports of the first reference signal and at least one of:
a frequency offset estimation;
a channel state information measurement; or
a channel estimation.

The first communication device includes a terminal, a roadside unit (RSU) (such as a traffic light, a light pole, etc.), or a small base station, but it is not limited to this.

The second communication device includes a terminal, a roadside unit RSU (such as a traffic light, a light pole, etc.), or a small base station, but it is not limited to this.

According to the signal processing method in the present disclosure, a first reference signal is transmitted to a second communication device; where the first reference signal is used for an automatic gain control measurement of at least two ports of the first reference signal and at least one of: a frequency offset estimation; a channel state information measurement; or a channel estimation. It is able to enable the sending end to send multi-port multi-purpose reference signal (multi-purpose reference signal, MP-RS), the signal supports at least two ports, which can complete multi-port automatic gain control measurement by using a single signal, and at the same time have multi-port frequency offset estimation, multi-port channel state information measurement, multi-port channel estimation and other functions, thereby supporting multi-port and avoiding time-frequency resource waste, improving the bit error rate performance and resource utilization performance of the sidelink data transmission of the direct link, solving the problem of excessive resource consumption when supporting multiple functions in the NR V2X multi-port direct link communication in the related art.

A sequence type of the first reference signal is a pseudo-random sequence or a constant amplitude zero auto-correlation sequence.

Specifically: the pseudo-random sequence includes the longest linear feedback shift register m sequence, the Gold sequence, or the GMW sequence.

The constant amplitude zero auto-correlation sequence includes zero autocorrelation ZC sequence (Zadoff-Chu sequence), Frank sequence, Golomb sequence, chirp sequence, and the like.

the first reference signal occupies at least one symbol in the time domain.

In the embodiment of the present disclosure, different ports of the first reference signal correspond to at least one of different sequences, different cyclic shifts, different time domain positions or different frequency domain positions.

Specifically, the first reference signal is mapped in time domain and/or frequency domain in a comb mapping manner, and is mapped to a preset working bandwidth.

It may also be that the first reference signal is time-domain and/or frequency-domain mapped in a continuous mapping manner, and is mapped to a preset working bandwidth; the continuous mapping manner refers to mapping one by one according to the subcarrier sequence number.

The preset working bandwidth is one of an entire working bandwidth, part of a working bandwidth, an entire carrier bandwidth, part of a carrier bandwidth, or a configured bandwidth part BWP.

The related features after the mapping of the first reference signal are as follows:

(1) If different ports of the first reference signal correspond to different time domain positions, different ports occupy different time domain positions after the first reference signal is mapped;

If different ports of the first reference signal correspond to the same time domain position, the different ports occupy the same time domain position after the first reference signal is mapped;

(2) If different ports of the first reference signal correspond to different frequency domain positions, different ports occupy different frequency domain positions after the first reference signal is mapped;

If different ports of the first reference signal correspond to the same frequency domain position, different ports occupy the same frequency domain position after the first reference signal is mapped;

(3) If different ports of the first reference signal correspond to different sequences, the different ports occupy the same or different time domain positions and the same or different frequency domain positions after the first reference signal is mapped;

If different ports of the first reference signal correspond to the same sequence, the different ports occupy the same or different time domain positions and the same or different frequency domain positions after the mapping of the first reference signal;

(4) If different ports of the first reference signal correspond to different cyclic shifts, different ports occupy the same or different time domain positions and the same or different frequency domain positions after the mapping of the first reference signal;

If different ports of the first reference signal correspond to the same cyclic shift, the different ports occupy the same or different time domain positions and occupy the same or different frequency domain positions after the mapping of the first reference signal.

Regarding the first reference signal used for automatic gain control measurement, frequency offset estimation, channel state information measurement or channel estimation, the details are as follows:

(1) the first reference signal is used for the automatic gain control measurement of the at least two ports of the first reference signal; the first reference signal is configured to, according to a signal strength of a sequence received by each port of the first reference signal, enable the second communication device to adjust a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

(2) the first reference signal is used for the frequency offset estimation of at least two ports of the first reference signal, where the first reference signal is used for: enabling the second communication device to obtain an initial frequency offset estimation value corresponding to each port of the first reference signal; according to the initial frequency offset estimation value and at least one frequency offset adjustment value corresponding to each port, obtaining at least two frequency offset trial values corresponding to each port; and performing a frequency offset compensation on the sequence received by each port according to the at least two frequency offset trial values corresponding to each port.

The obtaining the initial frequency offset estimation value corresponding to each port of the first reference signal includes: dividing the sequence received by each port of the first reference signal into two sequences, and performing a correlation processing on the two sequences with a local sequence corresponding to a corresponding port respectively; obtaining a phase difference value between the two sequences after the correlation processing; and obtaining the initial frequency offset estimation value corresponding to the corresponding port according to the phase difference value.

Specifically, the performing the frequency offset compensation on the sequence received by each port according to the at least two frequency offset trial values corresponding to each port includes: performing a correlation calculations according to the at least two frequency offset trial values corresponding to each port, to obtain at least two correlation peaks corresponding to each port; obtaining a frequency offset trial value corresponding to a maximum value of the at least two correlation peaks corresponding to each port as an optimal frequency offset trial value corresponding to each port; and performing the frequency offset compensation on the sequence received by each port according to the optimal frequency offset trial value corresponding to each port.

(3) the first reference signal is used for the channel state information measurement of the at least two ports of the first reference signal, where the first reference signal is configured to enable the second communication device to perform the channel state information measurement on the at least two ports of the first reference signal according to the first reference signal, to obtain a channel state information measurement result of the at least two ports of the first reference signal.

Specifically, the first reference signal is configured to enable the second communication device to perform the channel state information measurement on the at least two ports of the first reference signal according to the first reference signal, to obtain a channel state information measurement result of the at least two ports of the first reference signal, where different ports of the reference signal correspond to different time domain positions, to enable the second communication device to obtain the channel state information measurement result of each port according to the time domain position corresponding to each port of the reference signal; and/or different ports of the reference signal correspond to different frequency domain positions, to enable the second communication device to obtain the channel state information measurement result of each port according to the frequency domain position corresponding to each port of the reference signal; and/or different ports of the reference signal correspond to different sequences, to enable the second communication device to obtain the channel state information measurement result of each port according to the sequence corresponding to each port of the reference signal; and/or different ports of the reference signal correspond to different cyclic shifts, to enable the second communication device to obtain the channel state information measurement result of each port according to the cyclic shift corresponding to each port of the reference signal.

(4) the first reference signal is used for the channel estimation of the at least two ports of the first reference signal, where the first reference signal is configured to enable the second communication device to perform the channel estimation of the at least two ports of the first reference signal according to the first reference signal, or to enable the second communication device to perform the channel estimation of the at least two ports of the first reference signal according to the first reference signal and a newly added demodulation reference signal DMRS.

A signal processing method is further provided in an embodiment of the present disclosure, which is applied to a second communication device, as shown in FIG. 3, including:

Step 31: receiving a first reference signal sent by a first communication device;

Step 32: performing, according to the first reference signal, an automatic gain control measurement of at least two ports of the first reference signal and at least one of:

a frequency offset estimation;

a channel state information measurement; or a channel estimation.

The first communication device includes a terminal, a roadside unit RSU (such as a traffic light, a light pole, etc.), or a small base station, but it is not limited to this.

The second communication device includes a terminal, a roadside unit RSU (such as a traffic light, a light pole, etc.), or a small base station, but it is not limited to this.

According to the signal processing method in the present disclosure, a first reference signal sent by a first communication device is received, according to the first reference signal, an automatic gain control measurement of at least two ports of the first reference signal and at least one of the following is performed: a frequency offset estimation; a channel state information measurement; or a channel estimation. It is able to enable the sending end to send multi-port multi-purpose reference signal (multi-purpose reference signal, MP-RS), the signal supports at least two ports, which can complete multi-port automatic gain control measurement by using a single signal, and at the same time have multi-port frequency offset estimation, multi-port channel state information measurement, multi-port channel estimation and other functions, thereby supporting multi-port and avoiding time-frequency resource waste, improving the bit error rate performance and resource utilization performance of the sidelink data transmission of the direct link, solving the problem of excessive resource consumption when supporting multiple functions in the NR V2X multi-port direct link communication in the related art.

A sequence type of the first reference signal is a pseudo-random sequence or a constant amplitude zero auto-correlation sequence.

Specifically: the pseudo-random sequence includes the longest linear feedback shift register m sequence, the Gold sequence, or the GMW sequence.

The constant amplitude zero auto-correlation sequence includes zero autocorrelation ZC sequence (Zadoff-Chu sequence), Frank sequence, Golomb sequence, Chirp sequence, and the like.

The first reference signal occupies at least one symbol in the time domain.

In the embodiment of the present disclosure, different ports of the first reference signal correspond to at least one of different sequences, different cyclic shifts, different time domain positions or different frequency domain positions.

Specifically, the first reference signal is mapped in time domain and/or frequency domain in a comb mapping manner, and is mapped to a preset working bandwidth.

It may also be that the first reference signal is mapped in the time domain and/or the frequency domain in a continuous mapping manner, and is mapped to a preset working bandwidth; the continuous mapping method refers to mapping one by one according to the subcarrier sequence number.

The preset working bandwidth is one of an entire working bandwidth, part of a working bandwidth, an entire carrier bandwidth, part of a carrier bandwidth, or a configured bandwidth part BWP.

The related features after the mapping of the first reference signal are as follows:

(1) If different ports of the first reference signal correspond to different time domain positions, different ports occupy different time domain positions after the first reference signal is mapped;

If different ports of the first reference signal correspond to the same time domain position, the different ports occupy the same time domain position after the first reference signal is mapped;

(2) If different ports of the first reference signal correspond to different frequency domain positions, different ports occupy different frequency domain positions after the first reference signal is mapped;

If different ports of the first reference signal correspond to the same frequency domain position, different ports occupy the same frequency domain position after the first reference signal is mapped;

(3) If different ports of the first reference signal correspond to different sequences, the different ports occupy the same or different time domain positions and the same or different frequency domain positions after the first reference signal is mapped;

If different ports of the first reference signal correspond to the same sequence, the different ports occupy the same or different time domain positions and the same or different frequency domain positions after the mapping of the first reference signal;

(4) If different ports of the first reference signal correspond to different cyclic shifts, different ports occupy the same or different time domain positions and the same or different frequency domain positions after the mapping of the first reference signal;

If different ports of the first reference signal correspond to the same cyclic shift, the different ports occupy the same or different time domain positions and occupy the same or different frequency domain positions after the mapping of the first reference signal.

Regarding automatic gain control measurement, frequency offset estimation, channel state information measurement, or channel estimation according to the first reference signal, the details are as follows:

(1) the performing, according to the first reference signal, the automatic gain control measurement of the at least two ports of the first reference signal, includes: according to a signal strength of a sequence received by each port of the first reference signal, adjusting a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

The performing, according to the first reference signal, the automatic gain control measurement of the at least two ports of the first reference signal, includes: in a case that a subcarrier interval SCS of a carrier communicating on a current direct link is smaller than a first preset threshold, performing the automatic gain control measurement for each port of the first reference signal by using the first reference signal with one symbol or a half of symbol; or in a case that a subcarrier interval SCS of a carrier communicating on a current direct link is larger than a first preset threshold, performing the automatic gain control measurement for each port of the first reference signal by using the first reference signal with at least two symbols; where different ports correspond to different gain compensation amounts.

The first preset threshold may be 15 KHz, but is not limited to this.

Further, in a case that the automatic gain control measurement for each port of the first reference signal is performed by using the first reference signal with a half of symbol, the method further includes: for each port of the first reference signal, performing other operations excepting the automatic gain control measurement, by using the first reference signal corresponding to a remaining half of symbol.

(2) the performing, according to the first reference signal, the frequency offset estimation of the at least two ports of the first reference signal and at least one of includes: obtaining an initial frequency offset estimation value corresponding to each port of the first reference signal; according to the initial frequency offset estimation value and at least one frequency offset adjustment value corresponding to each port, obtaining at least two frequency offset trial values corresponding to each port; and performing a frequency offset compensation on the sequence received by each port according to the at least two frequency offset trial values corresponding to each port.

The obtaining the initial frequency offset estimation value corresponding to each port of the first reference signal includes: dividing the sequence received by each port of the first reference signal into two sequences, and performing a correlation processing on the two sequences with a local sequence corresponding to a corresponding port respectively; obtaining a phase difference value between the two sequences after the correlation processing; and obtaining the initial frequency offset estimation value corresponding to the corresponding port according to the phase difference value Specifically, the performing the frequency offset compensation on the sequence received by each port according to at least two frequency offset trial values corresponding to each port includes: performing a correlation calculations according to the at least two frequency offset trial values corresponding to each port, to obtain at least two correlation peaks corresponding to each port; obtaining a frequency offset trial value corresponding to a maximum value of the at least two correlation peaks corresponding to each port as an optimal frequency offset trial value corresponding to each port; and performing the frequency offset compensation on the sequence received by each port according to the optimal frequency offset trial value corresponding to each port.

(3) the performing, according to the first reference signal, the channel state information measurement of the at least two ports of the first reference signal includes: performing, according to the first reference signal, the channel state information measurement of the at least two ports of the first reference signal, to obtain a channel state information measurement result of the at least two ports of the first reference signal.

Specifically, the performing, according to the first reference signal, the channel state information measurement of the at least two ports of the first reference signal to obtain the channel state information measurement result of the at least two ports of the first reference signal, includes: in a case that different ports of the reference signal correspond to different time domain positions, obtaining the channel state information measurement result of each port according to the time domain position corresponding to each port of the reference signal; and/or in a case that different ports of the reference signal correspond to different frequency domain positions, obtaining the channel state information measurement result of each port according to the frequency domain position corresponding to each port of the reference signal; and/or in a case that different ports of the reference signal correspond to different sequences, obtaining the channel state information measurement result of each port according to the sequence corresponding to each port of the reference signal; and/or in a case that different ports of the reference signal correspond to different cyclic shifts, obtaining the channel state information measurement result of each port according to the cyclic shift corresponding to each port of the reference signal.

(4) the performing, according to the first reference signal, the channel estimation of the at least two ports of the first reference signal includes: performing the channel estimation of the at least two ports of the first reference signal according to the first reference signal, or performing the channel estimation of the at least two ports of the first reference signal according to the first reference signal and a newly added demodulation reference signal DMRS.

The performing, according to the first reference signal, the channel estimation of the at least two ports of the first reference signal includes: in a case that a subcarrier interval SCS of a carrier communicating on a current direct link is smaller than a second preset threshold, performing the channel estimation of each port according to the sequence received by each port of the first reference signal.

The second preset threshold may be 15 KHz, but is not limited to this.

Specifically, the performing the channel estimation of the at least two ports of the first reference signal according to the first reference signal and the newly added demodulation reference signal DMRS includes: in a case that the SCS of the carrier communicating on the current direct link is larger than or equal to the second preset threshold, performing the channel estimation each port according to the sequence received by each port of the first reference signal and the corresponding newly added demodulation reference signal DMRS.

The signal processing method provided in the embodiments of the present disclosure will be further described below. The first communication device uses the terminal UE A as an example, and the second communication device uses UE B as an example.

In response to the above technical problems, the embodiments of the present disclosure provide a signal processing method, which mainly relates to a multi-port multi-purpose reference signal MP-RS, which is a multi-port multi-function reference signal. The signal can support automatic gain control measurement, frequency offset estimation, channel state information measurement, channel estimation and other functions of at least two ports at the same time; it can be used in the through-link Sidelink communication of the V2X system.

specifically:

(1) MP-RS is a specific sequence with a specific length, such as m sequence (the longest linear feedback shift register sequence), Gold sequence or ZC sequence (zero autocorrelation sequence); the sequence length occupies the entire working bandwidth in the frequency domain, one of the partial working bandwidth, the entire carrier bandwidth, the partial carrier bandwidth, or the configured bandwidth part BWP occupies at least one symbol in the time domain. The sequence length corresponding to each port of MP-RS is the same.

(2) MP-RS supports at least two ports, and different ports can be distinguished by at least one of different sequences, different cyclic shifts, different time domain positions, and different frequency domain positions.

(3) Different ports of MP-RS can correspond to different time domain resources: MP-RS can use comb mapping method for time domain mapping, which is mapped to the preset working bandwidth (the entire working bandwidth, the entire carrier bandwidth or part of the bandwidth). The ports are distinguished by the position of the comb teeth in the time domain, and different ports occupy different positions of the comb teeth in the time domain. Typically, configuring two time domain combs to correspond to supporting two ports; configuring four time domain combs to correspond to supporting four ports.

(4) Different ports of MP-RS can correspond to different frequency domain resources: MP-RS can use comb mapping method to perform frequency domain mapping, and map to the preset working bandwidth (the entire working bandwidth, the entire carrier bandwidth or part of the bandwidth). Ports are distinguished by the position of the comb teeth in the frequency domain, and different ports occupy different positions of the comb teeth in the frequency domain. Typically, configuring two frequency domain combs to correspond to supporting two ports; configuring four frequency domain combs to correspond to supporting four ports.

(5) Different ports of MP-RS can correspond to different sequences or cyclic shifts: MP-RS can use a continuous mapping method (that is, mapping one by one according to the subcarrier sequence number) for time domain mapping, and map to the preset working bandwidth (the entire work In terms of bandwidth, the entire carrier bandwidth or part of the bandwidth), ports can be distinguished by sequence or cyclic shift. Different ports can occupy the same or different time domain resource positions, but have different sequences or cyclic shifts.

(6) Different ports of MP-RS can correspond to different sequences or cyclic shifts: MP-RS can use a continuous mapping method (that is, mapping one by one according to the subcarrier sequence number) for frequency domain mapping, and map to the preset working bandwidth (the entire work In terms of bandwidth, the entire carrier bandwidth or part of the bandwidth), the ports can be distinguished by sequence or cyclic shift. Different ports can occupy the same or different frequency domain resource positions, but have different sequences or cyclic shifts.

(7) MP-RS is used for "multi-port automatic gain measurement": the sending UE A (can be sent before the physical sidelink control channel (PSCCH)) to send MP-RS, this signal is configured to help the receiving UE B is used for automatic gain measurement to avoid the problem of increased BER of subsequent PSCCH and data reception caused by excessive fluctuations in signal strength leading to excessive ADC quantization errors; and, MP-RS can support multi-port automatic gain measurement separately, Different ports have different gain compensation amounts.

(8) MP-RS is used for "multi-port frequency offset estimation": UE A at the transmitting side sends MP-RS, this signal is configured to help UE B at the receiving side do frequency offset estimation, and MP-RS can support separate estimation of different ports. The specific estimation schemes include:
  a) For each port of MP-RS, divide the sequence received by the port into two sequences, and the two sequences are respectively correlated with the local sequence corresponding to the port, and then the phase difference value between the two sequences after the correlation processing is calculated to obtain the initial frequency offset estimation value corresponding to the port;
  b) On the basis of the initial frequency offset estimation value, the frequency offset adjustment amount is added to obtain the frequency offset trial value; specifically, at least one frequency offset adjustment amount is required to obtain at least one frequency offset trial value; the initial frequency offset estimation value can also be used as a frequency offset trial value, corresponding to a frequency offset trial value, in short, at least two frequency deviation trial values are finally obtained;
  c) Use at least two frequency offset trial values to perform correlation calculations to obtain correlation peaks (each frequency offset trial value corresponds to a correlation peak), and the maximum value of at least two correlation peaks corresponding to at least two frequency deviation trial values The corresponding frequency offset is taken as the optimal frequency offset, and frequency offset compensation is performed on the sequence received by the port.
  d) For different ports, the UE on the receiving side can set different frequency offset compensations according to the maximum value of the detected correlation peaks corresponding to each port.

(9) MP-RS is used for "multi-port channel state information measurement": UE A at the transmitting side sends a multi-port MP-RS, this signal is configured to help UE B at the receiving side do channel state information measurement (about which method to use, it can be agreed in advance by two UE):
  a) For the measurement methods of different time domain resources or different frequency domain resources: UE B can directly use comb-shaped MP-RS covering the full working bandwidth to measure channel state information. Different ports occupy different comb teeth, the channel information measurement results of different ports can be obtained by UE B through sequences on different combs;
  b) For the measurement methods of different sequences or different cyclic shifts: UE A sends multi-port MP-RS, different ports of MP-RS use different sequences or different cyclic shifts, MP-RS can cover all working bandwidth, after UE B receives the multi-port MP-RS, it can obtain the channel state information of different ports on the entire working bandwidth.

(10) MP-RS is used for "multi-port channel estimation": the transmitting UE A sends a multi-port MP-RS, which is configured to help the receiving UE B to do channel estimation; MP-RS can provide channel estimation of at least two ports result.
  a) The sub-carrier spacing SCS of the carrier communicating on the current direct link is relatively small, the time used for automatic gain control AGC is less, and the MP-RS has enough time for channel estimation, and the channel estimation accuracy is higher at this time;
  b) When the SCS of the carrier communicating on the current direct link is relatively large, the time used for AGC is longer, and MP-RS uses less time for channel estimation or channel estimation cannot be performed. In this case, a new DMRS is required to complete channel estimation.

Specifically, taking MP-RS supporting two ports as an example, the transmission of MP-RS is shown in FIG. 4 (a represents a subframe, b represents a preset working bandwidth, and PSFCH represents a physical direct link feedback channel. (physical sidelink feedback channel), as shown, a small square (a blank square or a filled small square) in symbol #0 in FIG. 4 represents that the time domain lasts for 1 symbol, and the frequency domain is 1 subcarrier. As shown in FIG. 4, the MP-RS located at the first symbol uses a comb mapping method to map to the entire working bandwidth. There are two comb teeth, and each comb tooth corresponds to a port. In addition to the AGC function, MP-RS can also perform channel state measurement on the unicast communication link before communication, and perform channel estimation and frequency offset estimation during communication. In this way, MP-RS multiplexing can be configured to complete multiple channels. This function improves the bit error rate performance and resource utilization performance of Sidelink data transmission.

The solutions provided in the embodiments of the present disclosure are illustrated below with examples:

Example 1 (Using Different Time-Frequency Resources-Different Time-Domain Resources and/or Different Frequency-Domain Resources to Distinguish Ports)

Figure 5:
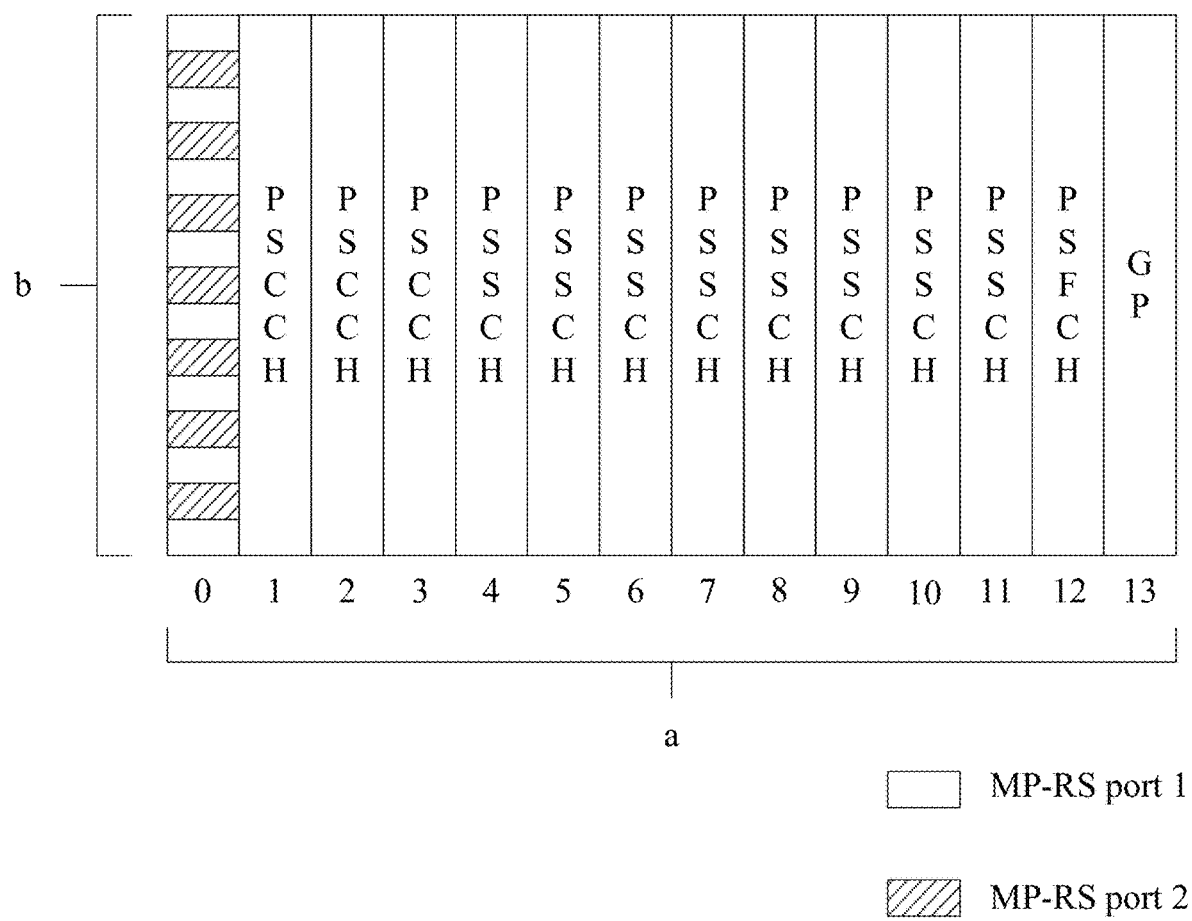
FIG. 5 is a second schematic diagram of multi-port MP-RS transmission according to an embodiment of the disclosure.

MP-RS occupies the first symbol and distinguishes ports through different comb teeth, and each comb tooth corresponds to a port. As shown in FIG. 5 (in the figure, a represents a subframe, and b represents a preset working bandwidth), the blank square or filled square on the first symbol occupies one symbol in the time domain and one sub-carrier in the frequency domain. The blank square represents port 1 of MP-RS, and the filled square represents port 2 of MP-RS. The receiving-side terminal can obtain related information of the two ports through the sequences mapped on the two different ports, including automatic gain control information, frequency offset estimation information, channel state measurement information, channel estimation information, and so on. Since the MP-RS maps different port measurement sequences through different time-frequency resources, the receiving-side terminal can measure different ports separately and obtain different measurement information.

In this example, the multi-port MP-RS sequence mapping method can ensure that the two ports are completely orthogonal and the measurement result is accurate.

Example 2 (Using the Same Time-Frequency Resources and Different Sequences to Distinguish Ports)

Figure 6:
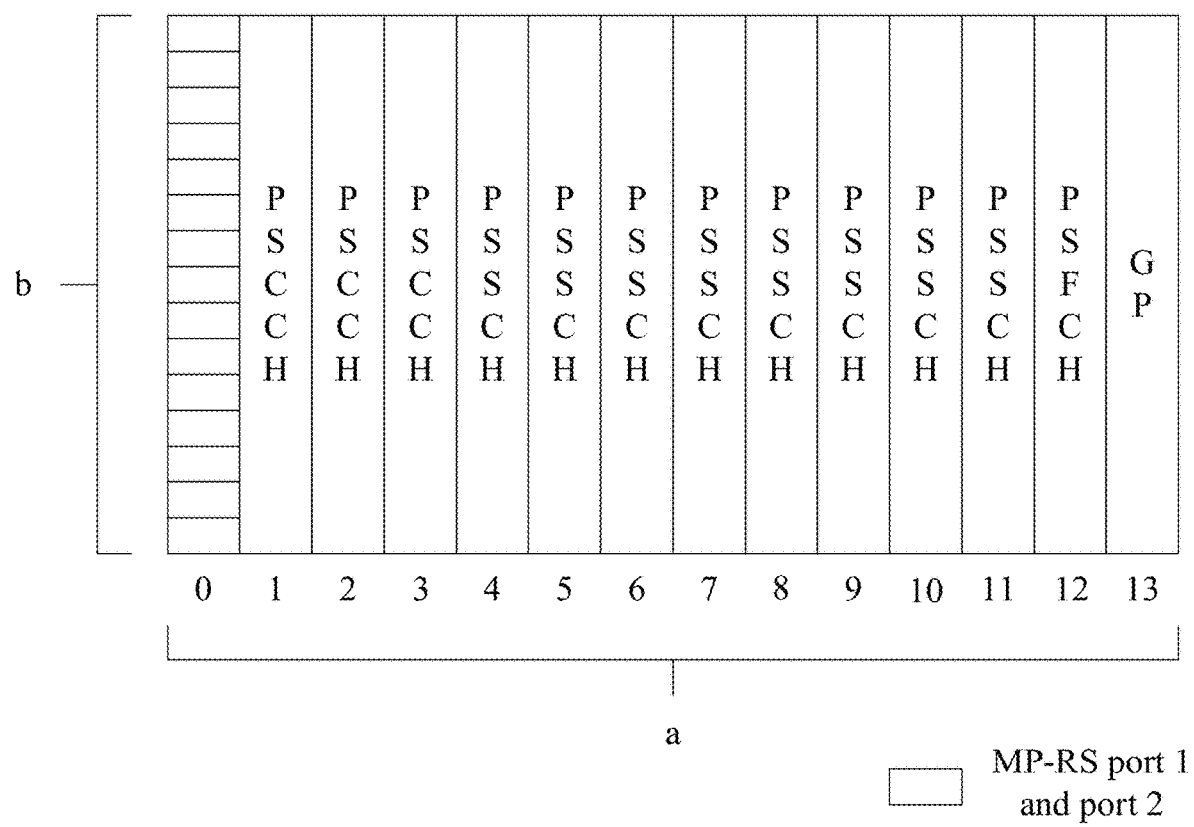
FIG. 6 is a third schematic diagram of multi-port MP-RS transmission according to an embodiment of the disclosure.

MP-RS occupies the first symbol and distinguishes ports through different sequences. Each sequence corresponds to a port. In order to reduce the interference between the two ports, the sequence used by the two ports can be low correlation. As shown in FIG. 6 (a represents a subframe, and b represents a preset working bandwidth), the blank square on the first symbol occupies one symbol in the time domain and one subcarrier in the frequency domain. The blank squares represent port 1 and port 2 of MP-RS. The receiving-side terminal can obtain related information of the two ports through the sequences mapped on the two different ports, including automatic gain control information, frequency offset estimation information, channel state measurement information, channel estimation information, and so on. Since the MP-RS maps different port measurement sequences through different sequences, the receiving-side terminal can measure different ports separately and obtain different measurement information.

In this example, the multi-port MP-RS sequence mapping method occupies less time-frequency resources per port on average, and the number of ports that can be mapped is larger.

Example 3 (Using the Same Time-Frequency Resources, the Same Sequence, and Different Cyclic Shifts to Distinguish Ports)

Figure 7:
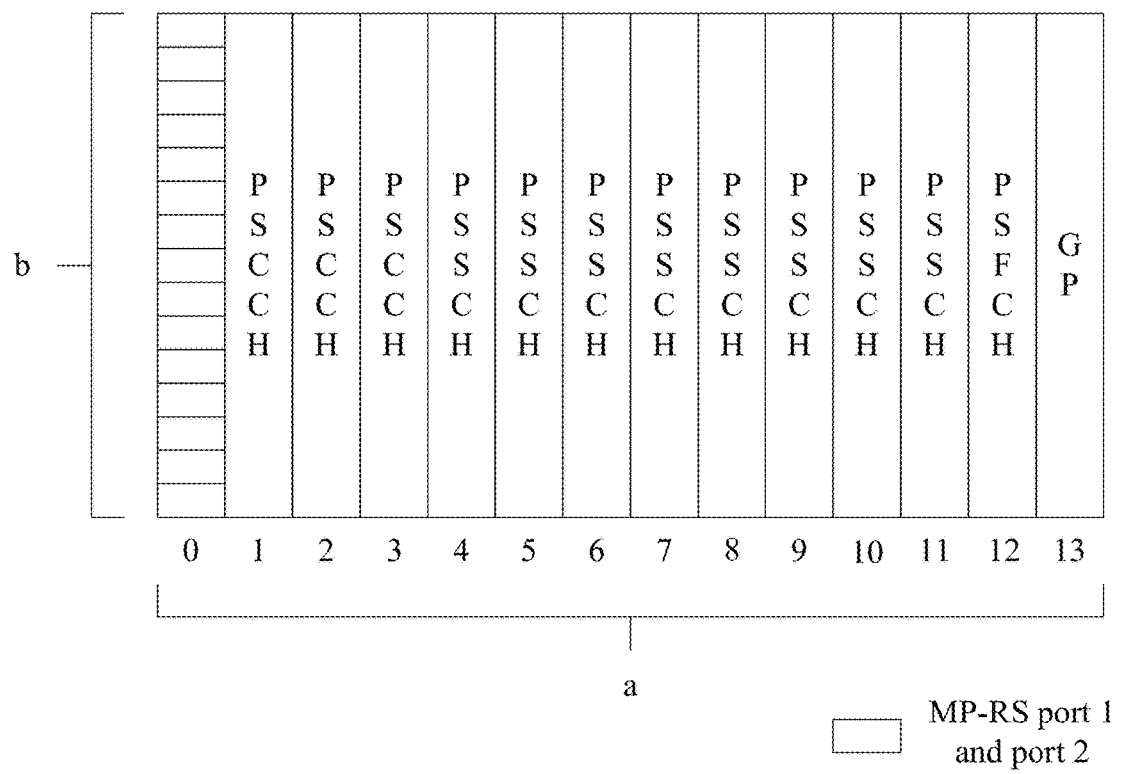
FIG. 7 is a fourth schematic diagram of multi-port MP-RS sending according to an embodiment of the disclosure.

MP-RS occupies the first symbol, and the ports can be distinguished by different cyclic shifts of the same sequence. Each cyclic shift corresponds to a port. In order to reduce the interference between the two ports, the cycle shift used by the two ports can be low correlated. As shown in FIG. 7 (a represents a subframe and b represents a preset working bandwidth), the blank square on the first symbol occupies one symbol in the time domain and one subcarrier in the frequency domain. The blank squares represent port 1 and port 2 of MP-RS. The receiving-side terminal can obtain related information of the two ports through the sequences mapped on the two different ports, including automatic gain control information, frequency offset estimation information, channel state measurement information, channel estimation information, and so on. Since the MP-RS maps different port measurement sequences through different cyclic shifts of the same sequence, the receiving-side terminal can measure different ports separately and obtain different measurement information.

In this example, the multi-port MP-RS sequence mapping method occupies less time-frequency resources per port on average, and the number of ports that can be mapped is larger.

Example 4 (MP-RS is Used for "Multi-Port Automatic Gain Measurement")

MP-RS is used for "multi-port automatic gain measurement": UE A on the transmitting side can send MP-RS before PSCCH is sent. This signal is configured to help UE B on the receiving side do automatic gain measurement to avoid excessive signal strength fluctuations. If the ADC quantization error is too large, the error rate of the subsequent PSCCH and data reception will increase, and the MP-RS can support multi-port automatic gain measurement separately, and different ports have different gain compensation amounts.
 a) When the SCS of the carrier communicating on the current direct link is small, the AGC measurement can be completed by using one-symbol or half-symbol MP-RS at this time;
 For example: when SCS=15 KHz, the corresponding symbol duration is 67 us, and the AGC duration is generally fixed, about 10-15 us, so the AGC measurement can be completed by using half-symbol MP-RS at this time. When SCS=60 KHz, the corresponding symbol duration is 17 us, so the MP-RS of one symbol can be configured to complete the AGC measurement.
 b) When the SCS of the carrier communicating on the current direct link is relatively large, it is necessary to use two or more symbols of MP-RS to complete the AGC measurement.
 For example: when SCS=120 KHz, the corresponding symbol duration is Bus, and the AGC duration is generally fixed, about 10-15 us, so the AGC measurement can only be completed by using two-symbol MP-RS at this time.
 c) The MP-RS of the remaining duration (the remaining part of a symbol) is used for other functions of the corresponding port (any function except AGC).
 Specifically, the frequency-domain discrete mapping can be configured to obtain the time-domain repeated MP-RS signal. In this way, when half a symbol is used as AGC, the remaining half symbol of MP-RS can be used for other functions.

Figure 8:
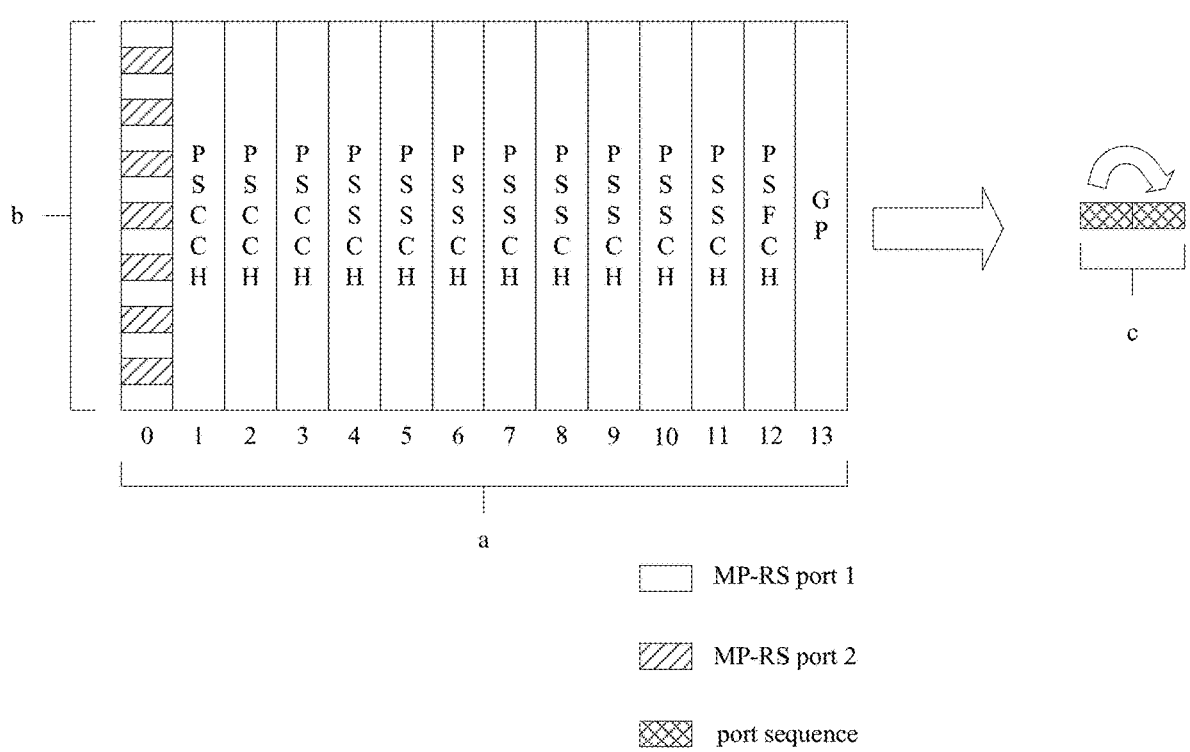
FIG. 8 is a fifth schematic diagram of multi-port MP-RS sending according to an embodiment of the disclosure.
Figure 9:
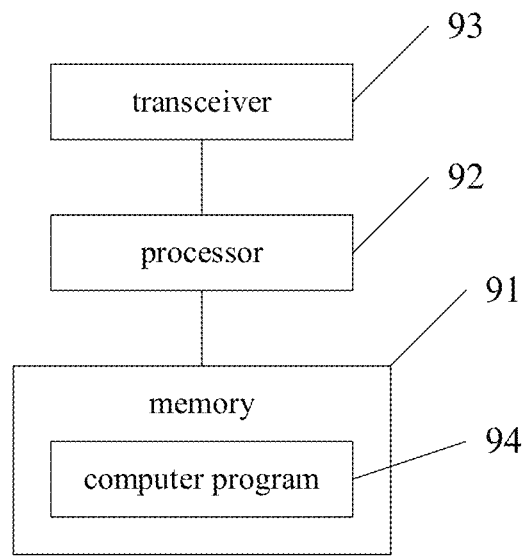
FIG. 9 is a first structural diagram of a communication device according to an embodiment of the disclosure.
Figure 10:
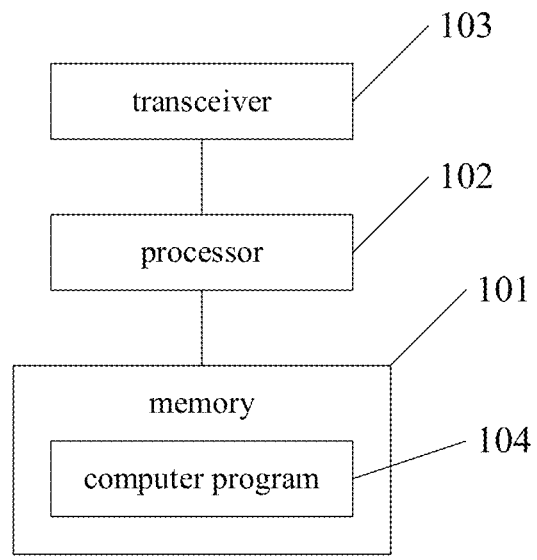
FIG. 10 is a second structural diagram of a communication device according to an embodiment of the disclosure.

As shown on the left side of FIG. 8 (a represents a subframe in the figure, b represents a preset working bandwidth, and c represents an orthogonal frequency division multiplexing OFDM symbol #0), the MP-RS is comb-shaped in the frequency domain at the transmitting end Mapping is converted from frequency domain to time domain after inverse fast Fourier transform (IFFT) before transmission. As shown on the right side of FIG. 8, it becomes a signal that is repeated in time domain within a symbol. The information of first half of the symbol and the second half of the symbol are exactly the same, so after receiving it at the receiving end, the MP-RS of the first half symbol can be used for AGC measurement, and the MP-RS of the second half symbol can be used for other functions, such as resource occupation State awareness.

In this example, the MP-RS is used in the "multi-port automatic gain measurement" method. MP-RS can adjust its duration adaptively according to the configuration of SCS, so as to ensure that there is enough time for ADC gain adjustment while not causing a waste of resources, and MP-RS can support multi-port automatic gain measurement separately, and different ports have different gain compensation amounts.

Example 5 (MP-RS is Used for "Multi-Port Frequency Offset Estimation")

MP-RS is used for "multi-port frequency offset estimation": UE A on the sending side can send MP-RS before sending the physical direct link control channel PSCCH or physical sidelink shared channel (PSSCH) This signal is configured to help UE B on the receiving side to estimate the frequency offset, and MP-RS can support the estimation of the frequency offset of different ports. The specific estimation schemes include:
 a) For each port of MP-RS, divide the sequence received by the port into two segments, and the two sequences are respectively correlated with the local sequence corresponding to the port, and then the phase difference value between the two sequences after the correlation processing is calculated to obtain the initial frequency offset estimation value corresponding to the port;
 b) On the basis of the initial frequency offset estimation value, the frequency offset adjustment amount is added to obtain the frequency offset trial value; specifically, at least one frequency offset adjustment amount is required to obtain at least one frequency offset trial value; the initial frequency offset estimation value can also be used as a frequency offset Trial value, corresponding to a frequency offset trial value, in short, at least two frequency deviation trial values are finally obtained;

c) Use at least two frequency offset trial values to perform correlation calculations to obtain correlation peaks (each frequency offset trial value corresponds to a correlation peak), and the maximum value of at least two correlation peaks corresponding to at least two frequency deviation trial values. The corresponding frequency offset is taken as the optimal frequency offset, and frequency offset compensation is performed on the sequence received by the port.

d) For different ports, the UE on the receiving side can set different frequency offset compensations according to the maximum value of the detected correlation peaks corresponding to each port.

In this example, this kind of MP-RS is used in the method of "multi-port frequency offset estimation" by multiplexing MP-RS signals for multi-port frequency offset estimation, which can obtain the frequency offset of the current transmitted data, which is beneficial to subsequent data demodulation an decoding, and for different ports, it can set different frequency offset compensation.

Example 6 (MP-RS is Used for "Multi-Port Channel State Information Measurement")

MP-RS is used for "multi-port channel state information measurement": UE A on the transmitting side can send MP-RS before sending PSCCH or PSSCH. This signal is configured to help UE B on the receiving side do channel state information measurement. MP-RS can support the measurement of channel state information of different ports:

a) For the measurement methods of different time domain resources or different frequency domain resources: UE B can directly use comb-shaped MP-RS covering the full working bandwidth to measure channel state information. Different ports occupy different comb teeth, the channel information measurement results of different ports can be obtained by UE B through sequences on different combs;

b) For the measurement methods of different sequences or different cyclic shifts: UE A sends multi-port MP-RS, different ports of MP-RS use different sequences or different cyclic shifts, MP-RS can cover all working bandwidth, after UE B receives the multi-port MP-RS, it can obtain the channel state information of different ports on the entire working bandwidth.

In this example, the MP-RS used in the "multi-port channel state information measurement" method multiplexes the MP-RS signal for multi-port channel state information measurement, and can obtain the channel state information of different ports of the current Sidelink unicast communication, save the channel state information-reference signal CSI-RS signaling overhead, and resource utilization efficiency is improved.

Example 7 (MP-RS is Used for "Multi-Port Channel Estimation")

MP-RS is used for "multi-port channel estimation": UE A on the transmitting side can send MP-RS before sending PSCCH or PSSCH. This signal is configured to help UE B on the receiving side for channel estimation. MP-RS can provide channel estimation results of at least two ports;

a) The SCS of the carrier communicating on the current direct link is relatively small, and the time used for AGC is small, and MP-RS has enough time for channel estimation, and the channel estimation accuracy is high at this time;

b) When the SCS of the carrier communicating on the current direct link is relatively large, the time used for AGC is longer, and MP-RS uses less time for channel estimation or channel estimation cannot be performed. In this case, a new DMRS is required to complete channel estimation.

In this example, the MP-RS is used in the "multi-port channel estimation" method to multiplex the MP-RS signal for channel estimation. The channel matrix H value of the current Sidelink unicast communication can be obtained, which saves DMRS signaling overhead and improves resource utilization efficiency, and MP-RS can provide channel estimation results for at least two ports.

Example 8 (the SCS of the MP-RS May be Different from the SCS of the PSCCH or PSSCH Sent Subsequently)

The sequence length of the MP-RS is fixed, for example, the length is 255, but the SCS of the MP-RS can be different from the SCS of the PSCCH or PSSCH sent subsequently, so that the MP-RS can cover the entire bandwidth:

a) When the SCS configured by the PSCCH or PSSCH is large and the working bandwidth is small, the MP-RS adopts a smaller SCS to ensure that there are enough subcarriers to accommodate the MP-RS sequence;

For example: when the working bandwidth of V2X is 5 MHz, when the SCS configured on the PSCCH or PSSCH is 15 KHz, there are 25 RBs, and each resource block RB has 12 subcarriers, which can accommodate 255-long MP-RS sequences, but in When the SCS configured for PSCCH or PSSCH is 30 KHz, the working bandwidth of 5 MHz is only 12 RBs, which cannot accommodate the 255-long MP-RS sequence. Therefore, the MP-RS needs to use a smaller SCS, that is, 15 KHz. It can be guaranteed that a 255-long MP-RS sequence can be accommodated in a 5 MHz bandwidth.

b) When the SCS configured by the PSCCH or PSSCH is small and the working bandwidth is large, the MP-RS adopts a larger SCS to ensure that the MP-RS sequence can cover the entire bandwidth.

For example: when the working bandwidth of V2X is 20 MHz, when the SCS configured for PSCCH or PSSCH is 60 KHz, there are 25 RBs, each RB has 12 subcarriers, and a 255-long MP-RS sequence can cover the entire 20 MHz bandwidth. When the SCS configured for PSCCH or PSSCH is 15 KHz, the working bandwidth of 20 MHz has 100 RBs, and the 255-long MP-RS sequence cannot cover the entire bandwidth. Therefore, the MP-RS needs to use a larger SCS, which is 60 KHz. This ensures that the 255-long MP-RS sequence can cover the entire 20 MHz bandwidth.

The SCS configuration method of the MP-RS sequence in this example is relatively flexible, and can be applied to various PSCCH or PSSCH SCS conditions and bandwidth conditions.

It is explained here that an example of an MP-RS occupying more than one symbol is similar to the above, and will not be repeated here, and the more symbols occupied, the higher the accuracy of the information is obtained.

It can be seen from the above embodiments of the present disclosure may specifically include a method for sending a multi-port multi-purpose (multi-purpose) reference signal for a direct link Sidelink. Compared with related art, the sending end sends a multi-port multi-purpose reference signal. Reference signal (MP-RS), this signal supports at least two ports, can use a single signal to complete multi-port automatic gain control measurement, but also has multi-port frequency offset estimation, multi-port channel state information measurement, multi-port channel estimation and other functions, it can support multiple ports, thereby avoiding the waste of time-frequency resources, thereby improving the bit error rate performance and resource utilization performance of Sidelink data transmission.

The embodiment of the present disclosure also provides a communication device. The communication device is a first communication device, as shown in FIG. The computer program 94 running on the processor 92; when the processor 92 executes the program, the following steps are implemented:

sending the first reference signal to the second communication device through the transceiver 93;
the first reference signal is used for an automatic gain control measurement of at least two ports of the first reference signal and at least one of:
a frequency offset estimation;
a channel state information measurement; or
a channel estimation.

According to the communication device in the present disclosure, the first reference signal is sent to the second communication device through the transceiver 93; where the first reference signal is used for an automatic gain control measurement of at least two ports of the first reference signal and at least one of: a frequency offset estimation; a channel state information measurement; or a channel estimation. It is able to enable the sending end to send multi-port multi-purpose reference signal (multi-purpose reference signal, MP-RS), the signal supports at least two ports, which can complete multi-port automatic gain control measurement by using a single signal, and at the same time have multi-port frequency offset estimation, multi-port channel state information measurement, multi-port channel estimation and other functions, thereby supporting multi-port and avoiding time-frequency resource waste, improving the bit error rate performance and resource utilization performance of the sidelink data transmission of the direct link, solving the problem of excessive resource consumption when supporting multiple functions in the NR V2X multi-port direct link communication in the related art.

A sequence type of the first reference signal is a pseudo-random sequence or a constant amplitude zero auto-correlation sequence.

the first reference signal occupies at least one symbol in the time domain.

In the embodiment of the present disclosure, different ports of the first reference signal correspond to at least one of different sequences, different cyclic shifts, different time domain positions or different frequency domain positions.

Specifically, the first reference signal is mapped in time domain and/or frequency domain in a comb mapping manner, and is mapped to a preset working bandwidth.

It may also be that the first reference signal is time-domain and/or frequency-domain mapped in a continuous mapping manner, and is mapped to a preset working bandwidth; the continuous mapping manner refers to mapping one by one according to the subcarrier sequence number.

The preset working bandwidth is one of an entire working bandwidth, part of a working bandwidth, an entire carrier bandwidth, part of a carrier bandwidth, or a configured bandwidth part BWP.

Regarding the first reference signal used for automatic gain control measurement, frequency offset estimation, channel state information measurement or channel estimation, the details are as follows:

(1) the first reference signal is used for the automatic gain control measurement of the at least two ports of the first reference signal; the first reference signal is configured to, according to a signal strength of a sequence received by each port of the first reference signal, enable the second communication device to adjust a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

(2) the first reference signal is used for the frequency offset estimation of at least two ports of the first reference signal, where the first reference signal is used for: enabling the second communication device to obtain an initial frequency offset estimation value corresponding to each port of the first reference signal; according to the initial frequency offset estimation value and at least one frequency offset adjustment value corresponding to each port, obtaining at least two frequency offset trial values corresponding to each port; and performing a frequency offset compensation on the sequence received by each port according to the at least two frequency offset trial values corresponding to each port.

The obtaining the initial frequency offset estimation value corresponding to each port of the first reference signal includes: dividing the sequence received by each port of the first reference signal into two sequences, and performing a correlation processing on the two sequences with a local sequence corresponding to a corresponding port respectively; obtaining a phase difference value between the two sequences after the correlation processing; and obtaining the initial frequency offset estimation value corresponding to the corresponding port according to the phase difference value.

Specifically, the performing the frequency offset compensation on the sequence received by each port according to the at least two frequency offset trial values corresponding to each port includes: performing a correlation calculations according to the at least two frequency offset trial values corresponding to each port, to obtain at least two correlation peaks corresponding to each port; obtaining a frequency offset trial value corresponding to a maximum value of the at least two correlation peaks corresponding to each port as an optimal frequency offset trial value corresponding to each port; and performing the frequency offset compensation on the sequence received by each port according to the optimal frequency offset trial value corresponding to each port.

(3) the first reference signal is used for the channel state information measurement of the at least two ports of the first reference signal, where the first reference signal is configured to enable the second communication device to perform the channel state information measurement on the at least two ports of the first reference signal according to the first reference signal, to obtain a channel state information measurement result of the at least two ports of the first reference signal.

Specifically, the first reference signal is configured to enable the second communication device to perform the channel state information measurement on the at least two ports of the first reference signal according to the first reference signal, to obtain a channel state information measurement result of the at least two ports of the first reference signal, where different ports of the reference signal correspond to different time domain positions, to enable the second communication device to obtain the channel state information measurement result of each port according to the time domain position corresponding to each port of the reference signal; and/or different ports of the reference signal correspond to different frequency domain positions, to enable the second communication device to obtain the channel state information measurement result of each port according to the frequency domain position corresponding to each port of the reference signal; and/or different ports of the reference signal correspond to different sequences, to enable the second communication device to obtain the channel state information measurement result of each port according to the sequence corresponding to each port of the reference signal; and/or different ports of the reference signal correspond to different cyclic shifts, to enable the second communication device to obtain the channel state information measurement result of each port according to the cyclic shift corresponding to each port of the reference signal.

(4) the first reference signal is used for the channel estimation of the at least two ports of the first reference signal, where the first reference signal is configured to enable the second communication device to perform the channel estimation of the at least two ports of the first reference signal according to the first reference signal, or to enable the second communication device to perform the channel estimation of the at least two ports of the first reference signal according to the first reference signal and a newly added demodulation reference signal DMRS.

The implementation embodiments of the signal processing method on the side of the first communication device are all applicable to the embodiments of the communication device, and the same technical effect can also be achieved.

The embodiment of the present disclosure also provides a communication device. The communication device is a second communication device, as shown in FIG. The computer program 104 running on the processor 102; when the processor 102 executes the program, the following steps are implemented:

receiving a first reference signal sent by a first communication device through the transceiver 103;

performing, according to the first reference signal, an automatic gain control measurement of at least two ports of the first reference signal and at least one of:

a frequency offset estimation;

a channel state information measurement; or a channel estimation.

According to the communication device in the present disclosure, a first reference signal sent by a first communication device is received, according to the first reference signal, an automatic gain control measurement of at least two ports of the first reference signal and at least one of the following is performed: a frequency offset estimation; a channel state information measurement; or a channel estimation. It is able to enable the sending end to send multi-port multi-purpose reference signal (multi-purpose reference signal, MP-RS), the signal supports at least two ports, which can complete multi-port automatic gain control measurement by using a single signal, and at the same time have multi-port frequency offset estimation, multi-port channel state information measurement, multi-port channel estimation and other functions, thereby supporting multi-port and avoiding time-frequency resource waste, improving the bit error rate performance and resource utilization performance of the sidelink data transmission of the direct link, solving the problem of excessive resource consumption when supporting multiple functions in the NR V2X multi-port direct link communication in the related art.

A sequence type of the first reference signal is a pseudo-random sequence or a constant amplitude zero auto-correlation sequence.

The first reference signal occupies at least one symbol in the time domain.

In the embodiment of the present disclosure, different ports of the first reference signal correspond to at least one of different sequences, different cyclic shifts, different time domain positions or different frequency domain positions.

Specifically, the first reference signal is mapped in time domain and/or frequency domain in a comb mapping manner, and is mapped to a preset working bandwidth.

It may also be that the first reference signal is mapped in the time domain and/or the frequency domain in a continuous mapping manner, and is mapped to a preset working bandwidth; the continuous mapping method refers to mapping one by one according to the subcarrier sequence number.

The preset working bandwidth is one of an entire working bandwidth, part of a working bandwidth, an entire carrier bandwidth, part of a carrier bandwidth, or a configured bandwidth part BWP.

Regarding automatic gain control measurement, frequency offset estimation, channel state information measurement, or channel estimation according to the first reference signal, the details are as follows:

(1) the processor is configured to perform: according to a signal strength of a sequence received by each port of the first reference signal, adjusting a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

The processor is configured to perform: in a case that a subcarrier interval SCS of a carrier communicating on a current direct link is smaller than a first preset threshold, performing the automatic gain control measurement for each port of the first reference signal by using the first reference signal with one symbol or a half of symbol; or in a case that a subcarrier interval SCS of a carrier communicating on a current direct link is larger than a first preset threshold, performing the automatic gain control measurement for each port of the first reference signal by using the first reference signal with at least two symbols; where different ports correspond to different gain compensation amounts.

Further, in a case that the automatic gain control measurement for each port of the first reference signal is performed by using the first reference signal with a half of symbol, the processor is configured to perform: for each port of the first reference signal, performing other operations excepting the automatic gain control measurement, by using the first reference signal corresponding to a remaining half of symbol.

(2) the processor is configured to perform: obtaining an initial frequency offset estimation value corresponding to each port of the first reference signal; according to the initial frequency offset estimation value and at least one frequency offset adjustment value corresponding to each port, obtaining at least two frequency offset trial values corresponding to each port; and performing a frequency offset compensation on the sequence received by each port according to the at least two frequency offset trial values corresponding to each port.

The processor is configured to perform: dividing the sequence received by each port of the first reference signal into two sequences, and performing a correlation processing on the two sequences with a local sequence corresponding to a corresponding port respectively; obtaining a phase difference value between the two sequences after the correlation processing; and obtaining the initial frequency offset estimation value corresponding to the corresponding port according to the phase difference value Specifically, the processor is configured to perform: performing a correlation calculations according to the at least two frequency offset trial values corresponding to each port, to obtain at least two correlation peaks corresponding to each port; obtaining a frequency offset trial value corresponding to a maximum value of the at least two correlation peaks corresponding to each port as an optimal frequency offset trial value corresponding to each port; and performing the frequency offset compensation on the sequence received by each port according to the optimal frequency offset trial value corresponding to each port.

(3) the processor is configured to perform: performing, according to the first reference signal, the channel state information measurement of the at least two ports of the first reference signal, to obtain a channel state information measurement result of the at least two ports of the first reference signal.

Specifically, the processor is configured to perform: in a case that different ports of the reference signal correspond to different time domain positions, obtaining the channel state information measurement result of each port according to the time domain position corresponding to each port of the reference signal; and/or in a case that different ports of the reference signal correspond to different frequency domain positions, obtaining the channel state information measurement result of each port according to the frequency domain position corresponding to each port of the reference signal; and/or the processor is configured to perform: in a case that different ports of the reference signal correspond to different sequences, obtaining the channel state information measurement result of each port according to the sequence corresponding to each port of the reference signal; and/or in a case that different ports of the reference signal correspond to different cyclic shifts, obtaining the channel state information measurement result of each port according to the cyclic shift corresponding to each port of the reference signal.

(4) the processor is configured to perform: performing the channel estimation of the at least two ports of the first reference signal according to the first reference signal, or performing the channel estimation of the at least two ports of the first reference signal according to the first reference signal and a newly added demodulation reference signal DMRS.

the processor is configured to perform: in a case that a subcarrier interval SCS of a carrier communicating on a current direct link is smaller than a second preset threshold, performing the channel estimation of each port according to the sequence received by each port of the first reference signal.

Specifically, the processor is configured to perform: in a case that the SCS of the carrier communicating on the current direct link is larger than or equal to the second preset threshold, performing the channel estimation each port according to the sequence received by each port of the first reference signal and the corresponding newly added demodulation reference signal DMRS.

The implementation embodiments of the signal processing method on the second communication device side are all applicable to the embodiments of the communication device, and the same technical effect can also be achieved.

The embodiment of the present disclosure also provides a computer-readable storage medium on which a computer program is stored, and when the program is executed by a processor, the steps of the signal processing method on the first communication device side are realized; or when the program is executed by the processor, the steps of the signal processing method on the second communication device side are realized.

the foregoing implementation embodiments of the signal processing method on the first communication device side or the second communication device side are all applicable to the embodiment of the computer-readable storage medium, and correspondingly the same technical effects can also be achieved.

Figure 11:
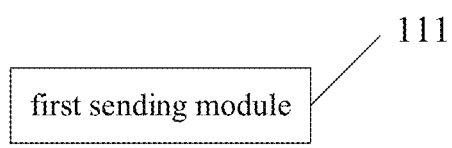
FIG. 11 is a first structural diagram of a signal processing device according to an embodiment of the disclosure.

The embodiment of the present disclosure also provides a signal processing device, which is applied to the first communication device, as shown in FIG. 11, including:

a first sending module 111, configured to send a first reference signal to a second communication device;

where the first reference signal is used for an automatic gain control measurement of at least two ports of the first reference signal and at least one of:

a frequency offset estimation;

a channel state information measurement; or a channel estimation.

According to the communication device in the present disclosure, the first reference signal is sent to the second communication device through the transceiver 93; where the first reference signal is used for an automatic gain control measurement of at least two ports of the first reference signal and at least one of: a frequency offset estimation; a channel state information measurement; or a channel estimation. It is able to enable the sending end to send multi-port multi-purpose reference signal (multi-purpose reference signal, MP-RS), the signal supports at least two ports, which can complete multi-port automatic gain control measurement by using a single signal, and at the same time have multi-port frequency offset estimation, multi-port channel state information measurement, multi-port channel estimation and other functions, thereby supporting multi-port and avoiding time-frequency resource waste, improving the bit error rate performance and resource utilization performance of the sidelink data transmission of the direct link, solving the problem of excessive resource consumption when supporting multiple functions in the NR V2X multi-port direct link communication in the related art.

A sequence type of the first reference signal is a pseudo-random sequence or a constant amplitude zero auto-correlation sequence.

the first reference signal occupies at least one symbol in the time domain.

In the embodiment of the present disclosure, different ports of the first reference signal correspond to at least one of different sequences, different cyclic shifts, different time domain positions or different frequency domain positions.

Specifically, the first reference signal is mapped in time domain and/or frequency domain in a comb mapping manner, and is mapped to a preset working bandwidth.

It may also be that the first reference signal is time-domain and/or frequency-domain mapped in a continuous mapping manner, and is mapped to a preset working bandwidth; the continuous mapping manner refers to mapping one by one according to the subcarrier sequence number.

The preset working bandwidth is one of an entire working bandwidth, part of a working bandwidth, an entire carrier bandwidth, part of a carrier bandwidth, or a configured bandwidth part BWP.

Regarding the first reference signal used for automatic gain control measurement, frequency offset estimation, channel state information measurement or channel estimation, the details are as follows:

(1) the first reference signal is used for the automatic gain control measurement of the at least two ports of the first reference signal; the first reference signal is configured to, according to a signal strength of a sequence received by each port of the first reference signal, enable the second communication device to adjust a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

(2) the first reference signal is used for the frequency offset estimation of at least two ports of the first reference signal, where the first reference signal is used for: enabling the second communication device to obtain an initial frequency offset estimation value corresponding to each port of the first reference signal; according to the initial frequency offset estimation value and at least one frequency offset adjustment value corresponding to each port, obtaining at least two frequency offset trial values corresponding to each port; and performing a frequency offset compensation on the sequence received by each port according to the at least two frequency offset trial values corresponding to each port.

The obtaining the initial frequency offset estimation value corresponding to each port of the first reference signal includes: dividing the sequence received by each port of the first reference signal into two sequences, and performing a correlation processing on the two sequences with a local sequence corresponding to a corresponding port respectively; obtaining a phase difference value between the two sequences after the correlation processing; and obtaining the initial frequency offset estimation value corresponding to the corresponding port according to the phase difference value.

Specifically, the performing the frequency offset compensation on the sequence received by each port according to the at least two frequency offset trial values corresponding to each port includes: performing a correlation calculations according to the at least two frequency offset trial values corresponding to each port, to obtain at least two correlation peaks corresponding to each port; obtaining a frequency offset trial value corresponding to a maximum value of the at least two correlation peaks corresponding to each port as an optimal frequency offset trial value corresponding to each port; and performing the frequency offset compensation on the sequence received by each port according to the optimal frequency offset trial value corresponding to each port.

(3) the first reference signal is used for the channel state information measurement of the at least two ports of the first reference signal, where the first reference signal is configured to enable the second communication device to perform the channel state information measurement on the at least two ports of the first reference signal according to the first reference signal, to obtain a channel state information measurement result of the at least two ports of the first reference signal.

Specifically, the first reference signal is configured to enable the second communication device to perform the channel state information measurement on the at least two ports of the first reference signal according to the first reference signal, to obtain a channel state information measurement result of the at least two ports of the first reference signal, where different ports of the reference signal correspond to different time domain positions, to enable the second communication device to obtain the channel state information measurement result of each port according to the time domain position corresponding to each port of the reference signal; and/or different ports of the reference signal correspond to different frequency domain positions, to enable the second communication device to obtain the channel state information measurement result of each port according to the frequency domain position corresponding to each port of the reference signal; and/or different ports of the reference signal correspond to different sequences, to enable the second communication device to obtain the channel state information measurement result of each port according to the sequence corresponding to each port of the reference signal; and/or different ports of the reference signal correspond to different cyclic shifts, to enable the second communication device to obtain the channel state information measurement result of each port according to the cyclic shift corresponding to each port of the reference signal.

(4) the first reference signal is used for the channel estimation of the at least two ports of the first reference signal, where the first reference signal is configured to enable the second communication device to perform the channel estimation of the at least two ports of the first reference signal according to the first reference signal, or to enable the second communication device to perform the channel estimation of the at least two ports of the first reference signal according to the first reference signal and a newly added demodulation reference signal DMRS.

The implementation embodiments of the signal processing method on the side of the first communication device are all applicable to the embodiments of the communication device, and the same technical effect can also be achieved.

Figure 12:
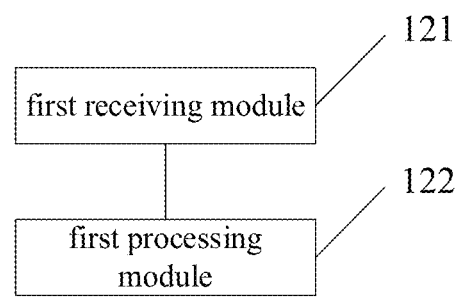
FIG. 12 is a second structural diagram of a signal processing device according to an embodiment of the disclosure.

The embodiment of the present disclosure also provides a signal processing device, which is applied to a second communication device, as shown in FIG. 12, including:

a first receiving module 121, configured to receive a first reference signal sent by a first communication device;

a first processing module 122, configured to perform, according to the first reference signal, an automatic gain control measurement of at least two ports of the first reference signal and at least one of:

a frequency offset estimation;

a channel state information measurement; or a channel estimation.

According to the communication device in the present disclosure, a first reference signal sent by a first communication device is received, according to the first reference signal, an automatic gain control measurement of at least two ports of the first reference signal and at least one of the following is performed: a frequency offset estimation; a channel state information measurement; or a channel estimation. It is able to enable the sending end to send multi-port multi-purpose reference signal (multi-purpose reference signal, MP-RS), the signal supports at least two ports, which can complete multi-port automatic gain control measurement by using a single signal, and at the same time have multi-port frequency offset estimation, multi-port channel state information measurement, multi-port channel estimation and other functions, thereby supporting multi-port and avoiding time-frequency resource waste, improving the bit error rate performance and resource utilization performance of the sidelink data transmission of the direct link, solving the problem of excessive resource consumption when supporting multiple functions in the NR V2X multi-port direct link communication in the related art.

A sequence type of the first reference signal is a pseudo-random sequence or a constant amplitude zero auto-correlation sequence.

The first reference signal occupies at least one symbol in the time domain.

In the embodiment of the present disclosure, different ports of the first reference signal correspond to at least one of different sequences, different cyclic shifts, different time domain positions or different frequency domain positions.

Specifically, the first reference signal is mapped in time domain and/or frequency domain in a comb mapping manner, and is mapped to a preset working bandwidth.

It may also be that the first reference signal is mapped in the time domain and/or the frequency domain in a continuous mapping manner, and is mapped to a preset working bandwidth; the continuous mapping method refers to mapping one by one according to the subcarrier sequence number.

The preset working bandwidth is one of an entire working bandwidth, part of a working bandwidth, an entire carrier bandwidth, part of a carrier bandwidth, or a configured bandwidth part BWP.

Regarding automatic gain control measurement, frequency offset estimation, channel state information measurement, or channel estimation according to the first reference signal, the details are as follows:

(1) The first processing module includes: a first processing sub-module, configured to adjust the correspondence of each port of the first reference signal in the local signal receiver according to the signal strength of the sequence received by each port of the first reference signal The scaling factor of the analog-to-digital converter is such that the signal intensity of the sequence received at each port of the first reference signal is in the preset intensity range after being scaled by the corresponding analog-to-digital converter.

the first processing module includes: a second processing sub-module, which is configured to measure the first reference signal when the sub-carrier interval SCS of the carrier communicating on the current direct link is less than a first preset threshold. Each port uses one symbol or half symbol of the first reference signal to perform automatic gain control measurement; or when the SCS of the carrier communicating on the current direct link is greater than or equal to the first preset threshold, Each port of the first reference signal uses at least two symbols of the first reference signal to perform automatic gain control measurement; wherein, different ports correspond to different gain compensation amounts.

Further, the signal processing device further includes: a second processing module, configured to use half a symbol of the first reference signal for automatic gain control measurement for each port of the first reference signal, then For each port of the first reference signal, use the corresponding remaining half symbol of the first reference signal to perform other operations except automatic gain control measurement.

(2) The first processing module includes: a first obtaining sub-module, configured to acquire the initial frequency offset estimation value corresponding to each port of the first reference signal; and a third processing sub-module, configured according to the corresponding The initial frequency offset estimation value and at least one frequency offset adjustment value are configured to obtain at least two frequency offset trial values corresponding to each port; the fourth processing sub-module is used for receiving at least two frequency offset trial values corresponding to each port Frequency offset compensation is performed on the sequence obtained.

The first obtaining sub-module includes: a first processing unit, configured to divide the sequence received at each port of the first reference signal into two sequences, and respectively correspond to the two sequences Correlation processing is performed on the local sequence corresponding to the port; the first acquiring unit is configured to acquire the phase difference value between the two sequences after the correlation processing is performed; the second processing unit is configured to obtain the corresponding port according to the phase difference value The corresponding initial frequency offset estimate.

Specifically, the fourth processing sub-module includes: a third processing unit, configured to perform correlation operations according to at least two frequency offset trial values corresponding to each port to obtain at least two correlation peaks corresponding to each port; and second obtaining Unit for obtaining the frequency offset trial value corresponding to the maximum value of the at least two correlation peaks corresponding to each port as the optimal frequency offset trial value corresponding to each port; the fourth processing unit is used for obtaining the frequency offset trial value corresponding to each port according to the maximum value corresponding to each port The optimal frequency offset trial value compensates the frequency offset of the sequence received at each port.

(3) The first processing module includes: a fifth processing sub-module, configured to perform channel state information measurement of at least two ports of the first reference signal according to the first reference signal to obtain the first reference signal The measurement results of the channel state information of at least two ports.

Specifically, the fifth processing sub-module includes: a fifth processing unit, configured to, if different ports of the first reference signal correspond to different time domain positions, perform a calculation according to the corresponding port of the first reference signal time domain position, obtain the channel state information measurement result of each port; and/or, if different ports of the first reference signal correspond to different frequency domain positions, then according to the frequency domain corresponding to each port of the first reference signal Position to obtain the channel state information measurement results of each port; and/or If different ports of the first reference signal correspond to different sequences, obtain the channel state information measurement result of each port according to the sequence corresponding to each port of the first reference signal; and/or if the first reference signal different ports of the signal correspond to different cyclic shifts, and the channel state information measurement results of each port are obtained according to the cyclic shifts corresponding to each port of the first reference signal.

(4) The first processing module includes: a sixth processing sub-module, configured to perform channel estimation of at least two ports of the first reference signal according to the first reference signal, or according to the first reference signal And adding a new demodulation reference signal DMRS, and perform channel estimation of at least two ports of the first reference signal.

The sixth processing sub-module includes: a sixth processing unit, which is used for when the subcarrier interval SCS of the carrier communicating on the current direct link is less than a second preset threshold, according to the first reference signal. The sequence received by each port is used for channel estimation of each port.

Specifically, the sixth processing sub-module includes: a seventh processing unit, configured to: when the SCS of the carrier communicating on the current direct link is greater than or equal to a second preset threshold, according to the value of the first reference signal The sequence received by each port and the corresponding newly added demodulation reference signal DMRS are used for channel estimation of each port.

The implementation embodiments of the signal processing method on the second communication device side are all applicable to the embodiments of the signal processing device, and the same technical effect can also be achieved.

It should be noted that many functional components described in this specification are referred to as modules/sub-modules/units, so as to emphasize the independence of their implementation modes more particularly.

In the embodiments of the present disclosure, the modules/sub-modules/units can be implemented by software so as to be executed by various types of processors. For example, an identified executable code module may include one or more physical or logical blocks of computer instructions, for example, it may be constructed as an object, process, or function. Nevertheless, the executable code of the identified module does not need to be physically located together, but can include different instructions stored in different bits. When these instructions are logically combined together, they constitute a module and implement the requirements of the module.

In fact, the executable code module can be a single instruction or many instructions, and can even be distributed on multiple different code segments, distributed in different programs, and distributed across multiple memory devices. Likewise, operating data can be identified within the module, and can be implemented in any suitable form and organized in any suitable type of data structure. The operating data may be collected as a single data set, or may be distributed in different locations (including on different storage devices), and at least partly may only exist as an electronic signal on a system or a network.

When the module can be implemented by software, taking into account the level of hardware technology in the related technology, so the module can be implemented by software, regardless of the cost, those skilled in the art can build the corresponding hardware circuit to achieve the corresponding function The hardware circuit includes conventional very large-scale integration (VLSI) circuits or gate arrays, as well as semiconductors or other discrete components in related art such as logic chips and transistors. Modules can also be implemented with programmable hardware devices, such as field programmable gate arrays, programmable array logic, programmable logic devices, etc.

A person of ordinary skill in the art may be aware that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered as going beyond the scope of the present disclosure.

Those skilled in the art can clearly understand that, for the convenience and conciseness of description, the specific working process of the above-described system, device, and unit can refer to the corresponding process in the foregoing method embodiment, which is not repeated here.

In the embodiments provided in this application, it should be understood that the disclosed device and method may be implemented in other ways. For example, the device embodiments described above are only illustrative. For example, the division of the units is only a logical function division, and there may be other divisions in actual implementation, for example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present disclosure essentially or the part that contributes to the related technology can be embodied in the form of a software product. The computer software product is stored in a storage medium and includes several instructions to make a computer device (which may be a personal computer, a server, or a network device, etc.) executes all or part of the steps of the methods described in the various embodiments of the present disclosure. The aforementioned storage media include: U disk, mobile hard disk, ROM, RAM, magnetic disk or optical disk and other media that can store program codes.

A person of ordinary skill in the art can understand that all or part of the processes in the above-mentioned embodiment methods can be implemented by controlling the relevant hardware through a computer program. The program can be stored in a computer readable storage medium. When executed, it may include the procedures of the above-mentioned method embodiments, the storage medium may be a magnetic disk, an optical disk, a read-only memory (Read-Only Memory, ROM), or a random access memory (Random Access Memory, RAM), etc.

It can be understood that the embodiments described in the embodiments of the present disclosure can be implemented by hardware, software, firmware, middleware, microcode, or a combination thereof. For hardware implementation, modules, units, and sub-units can be implemented in one or more application specific integrated circuits (ASIC), digital signal processors (Digital Signal Processor, DSP), and digital signal processing equipment (DSP Device, DSPD).), Programmable Logic Device (PLD), Field-Programmable Gate Array (FPGA), general-purpose processors, controllers, microcontrollers, microprocessors, configured to execute the present disclosure Other electronic units or a combination of the functions described above.

For software implementation, the technology described in the embodiments of the present disclosure can be implemented through modules (for example, procedures, functions, etc.) that perform the functions described in the embodiments of the present disclosure. The software codes can be stored in the memory and executed by the processor. The memory can be implemented in the processor or external to the processor.

The above are optional implementations of the present disclosure. It should be pointed out that for those of ordinary skill in the art, without departing from the principles described in the present disclosure, several improvements and modifications can be made, and these improvements and modifications should also be made. It is regarded as the scope of this disclosure.

What is claimed is:

1. A signal processing method, applied to a first communication device and comprising:
    sending a first reference signal to a second communication device;
    wherein the first reference signal is used for an automatic gain control measurement of at least two ports of the first reference signal and at least one of the following of the at least two ports of the first reference signal:
        a frequency offset estimation;
        a channel state information measurement; or
        a channel estimation.

2. The signal processing method according to claim 1, wherein a sequence type of the first reference signal is a pseudo-random sequence or a constant amplitude zero auto-correlation sequence.

3. The signal processing method according to claim 1, wherein the first reference signal occupies at least one symbol in a time domain.

4. The signal processing method according to claim 1, wherein different ports of the first reference signal correspond to at least one of different sequences, different cyclic shifts, different time domain positions or different frequency domain positions.

5. The signal processing method according to claim 4, wherein the first reference signal is mapped in time domain and/or frequency domain in a comb mapping manner, and is mapped to a preset working bandwidth;
    or
    the first reference signal is mapped in time domain and/or frequency domain in a continuous mapping manner, and is mapped to a preset working bandwidth;
        wherein the continuous mapping manner is a mapping one by one according to subcarrier sequence numbers;
    wherein the preset working bandwidth is one of an entire working bandwidth, part of a working bandwidth, an entire carrier bandwidth, part of a carrier bandwidth, or a configured bandwidth part BWP.

6. The signal processing method according to claim 1, wherein the first reference signal is used for the automatic gain control measurement of the at least two ports of the first reference signal;
    the first reference signal is configured to, according to a signal strength of a sequence received by each port of the first reference signal, enable the second communication device to adjust a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range.

7. The signal processing method according to claim 1, wherein the first reference signal is used for the frequency offset estimation of at least two ports of the first reference signal, wherein the first reference signal is used for:
    enabling the second communication device to obtain an initial frequency offset estimation value corresponding to each port of the first reference signal;
    according to the initial frequency offset estimation value and at least one frequency offset adjustment value corresponding to each port, obtaining at least two frequency offset trial values corresponding to each port; and
    performing a frequency offset compensation on the sequence received by each port according to the at least two frequency offset trial values corresponding to each port;
    wherein the obtaining the initial frequency offset estimation value corresponding to each port of the first reference signal comprises:
    dividing the sequence received by each port of the first reference signal into two sequences, and performing a correlation processing on the two sequences with a local sequence corresponding to a corresponding port respectively;
    obtaining a phase difference value between the two sequences after the correlation processing; and
    obtaining the initial frequency offset estimation value corresponding to the corresponding port according to the phase difference value;
    wherein the performing the frequency offset compensation on the sequence received by each port according to the at least two frequency offset trial values corresponding to each port comprises:
    performing a correlation calculations according to the at least two frequency offset trial values corresponding to each port, to obtain at least two correlation peaks corresponding to each port;
    obtaining a frequency offset trial value corresponding to a maximum value of the at least two correlation peaks corresponding to each port as an optimal frequency offset trial value corresponding to each port; and
    performing the frequency offset compensation on the sequence received by each port according to the optimal frequency offset trial value corresponding to each port.

8. The signal processing method according to claim 1, wherein the first reference signal is used for the channel state information measurement of the at least two ports of the first reference signal, wherein the first reference signal is configured to enable the second communication device to perform the channel state information measurement on the at least two ports of the first reference signal according to the first reference signal, to obtain a channel state information measurement result of the at least two ports of the first reference signal;

wherein the first reference signal is configured to enable the second communication device to perform the channel state information measurement on the at least two ports of the first reference signal according to the first reference signal, to obtain a channel state information measurement result of the at least two ports of the first reference signal, wherein different ports of the reference signal correspond to different time domain positions, to enable the second communication device to obtain the channel state information measurement result of each port according to the time domain position corresponding to each port of the reference signal; and/or different ports of the reference signal correspond to different frequency domain positions, to enable the second communication device to obtain the channel state information measurement result of each port according to the frequency domain position corresponding to each port of the reference signal; and/or different ports of the reference signal correspond to different sequences, to enable the second communication device to obtain the channel state information measurement result of each port according to the sequence corresponding to each port of the reference signal; and/or different ports of the reference signal correspond to different cyclic shifts, to enable the second communication device to obtain the channel state information measurement result of each port according to the cyclic shift corresponding to each port of the reference signal.

9. The signal processing method according to claim 1, wherein the first reference signal is used for the channel estimation of the at least two ports of the first reference signal, wherein
the first reference signal is configured to enable the second communication device to perform the channel estimation of the at least two ports of the first reference signal according to the first reference signal, or to enable the second communication device to perform the channel estimation of the at least two ports of the first reference signal according to the first reference signal and a newly added demodulation reference signal DMRS.

10. A signal processing method, applied to a second communication device and comprising:
receiving a first reference signal sent by a first communication device;
performing, according to the first reference signal, an automatic gain control measurement of at least two ports of the first reference signal and at least one of the following of the at least two ports of the first reference signal:
a frequency offset estimation;
a channel state information measurement; or
a channel estimation.

11. The signal processing method according to claim 10, wherein a sequence type of the first reference signal is a pseudo-random sequence or a constant amplitude zero auto-correlation sequence.

12. The signal processing method according to claim 10, wherein the first reference signal occupies at least one symbol in a time domain.

13. The signal processing method according to claim 10, wherein different ports of the first reference signal correspond to at least one of different sequences, different cyclic shifts, different time domain positions or different frequency domain positions.

14. The signal processing method according to claim 13, wherein the first reference signal is mapped in time domain and/or frequency domain in a comb mapping manner, and is mapped to a preset working bandwidth;
or
the first reference signal is mapped in time domain and/or frequency domain in a continuous mapping manner, and is mapped to a preset working bandwidth;
wherein the continuous mapping manner is a mapping one by one according to subcarrier sequence numbers;
wherein the preset working bandwidth is one of an entire working bandwidth, part of a working bandwidth, an entire carrier bandwidth, part of a carrier bandwidth, or a configured bandwidth part BWP.

15. The signal processing method according to claim 10, wherein the performing, according to the first reference signal, the automatic gain control measurement of the at least two ports of the first reference signal, comprises:
according to a signal strength of a sequence received by each port of the first reference signal, adjusting a scaling factor of an analog-to-digital converter corresponding to each port of the first reference signal in a local signal receiver, to enable the signal strength of the sequence received by each port of the first reference signal, after being scaled by a corresponding analog-to-digital converter, to be within a preset strength range;
wherein the performing, according to the first reference signal, the automatic gain control measurement of the at least two ports of the first reference signal, comprises:
in a case that a subcarrier interval SCS of a carrier communicating on a current direct link is smaller than a first preset threshold, performing the automatic gain control measurement for each port of the first reference signal by using the first reference signal with one symbol or a half of symbol; or
in a case that a subcarrier interval SCS of a carrier communicating on a current direct link is larger than a first preset threshold, performing the automatic gain control measurement for each port of the first reference signal by using the first reference signal with at least two symbols;
wherein different ports correspond to different gain compensation amounts;
wherein in a case that the automatic gain control measurement for each port of the first reference signal is performed by using the first reference signal with a half of symbol, the method further comprises:
for each port of the first reference signal, performing other operations excepting the automatic gain control measurement, by using the first reference signal corresponding to a remaining half of symbol.

16. The signal processing method according to claim 10, wherein the performing, according to the first reference signal, the frequency offset estimation of the at least two ports of the first reference signal and at least one of comprises:

obtaining an initial frequency offset estimation value corresponding to each port of the first reference signal;

according to the initial frequency offset estimation value and at least one frequency offset adjustment value corresponding to each port, obtaining at least two frequency offset trial values corresponding to each port; and performing a frequency offset compensation on the sequence received by each port according to the at least two frequency offset trial values corresponding to each port;

wherein the obtaining the initial frequency offset estimation value corresponding to each port of the first reference signal comprises:

dividing the sequence received by each port of the first reference signal into two sequences, and performing a correlation processing on the two sequences with a local sequence corresponding to a corresponding port respectively;

obtaining a phase difference value between the two sequences after the correlation processing; and obtaining the initial frequency offset estimation value corresponding to the corresponding port according to the phase difference value, wherein the performing the frequency offset compensation on the sequence received by each port according to at least two frequency offset trial values corresponding to each port comprises:

performing a correlation calculations according to the at least two frequency offset trial values corresponding to each port, to obtain at least two correlation peaks corresponding to each port;

obtaining a frequency offset trial value corresponding to a maximum value of the at least two correlation peaks corresponding to each port as an optimal frequency offset trial value corresponding to each port; and performing the frequency offset compensation on the sequence received by each port according to the optimal frequency offset trial value corresponding to each port.

17. The signal processing method according to claim 13, wherein the performing, according to the first reference signal, the channel state information measurement of the at least two ports of the first reference signal comprises:

performing, according to the first reference signal, the channel state information measurement of the at least two ports of the first reference signal, to obtain a channel state information measurement result of the at least two ports of the first reference signal;

wherein the performing, according to the first reference signal, the channel state information measurement of the at least two ports of the first reference signal to obtain the channel state information measurement result of the at least two ports of the first reference signal, comprises:

in a case that different ports of the reference signal correspond to different time domain positions, obtaining the channel state information measurement result of each port according to the time domain position corresponding to each port of the reference signal; and/or in a case that different ports of the reference signal correspond to different frequency domain positions, obtaining the channel state information measurement result of each port according to the frequency domain position corresponding to each port of the reference signal; and/or in a case that different ports of the reference signal correspond to different sequences, obtaining the channel state information measurement result of each port according to the sequence corresponding to each port of the reference signal; and/or in a case that different ports of the reference signal correspond to different cyclic shifts, obtaining the channel state information measurement result of each port according to the cyclic shift corresponding to each port of the reference signal.

18. The signal processing method according to claim 10, wherein the performing, according to the first reference signal, the channel estimation of the at least two ports of the first reference signal comprises:

performing the channel estimation of the at least two ports of the first reference signal according to the first reference signal, or performing the channel estimation of the at least two ports of the first reference signal according to the first reference signal and a newly added demodulation reference signal DMRS.

19. The signal processing method according to claim 18, wherein the performing, according to the first reference signal, the channel estimation of the at least two ports of the first reference signal comprises:

in a case that a subcarrier interval SCS of a carrier communicating on a current direct link is smaller than a second preset threshold, performing the channel estimation of each port according to the sequence received by each port of the first reference signal;

or the performing the channel estimation of the at least two ports of the first reference signal according to the first reference signal and the newly added demodulation reference signal DMRS comprises:

in a case that the SCS of the carrier communicating on the current direct link is larger than or equal to the second preset threshold, performing the channel estimation each port according to the sequence received by each port of the first reference signal and the corresponding newly added demodulation reference signal DMRS.

20. A communication device, the communication device being a first communication device and comprising a memory, a processor, a transceiver, and a computer program stored in the memory and executable on the processor, wherein the processor executes the computer program to perform:

sending a first reference signal to a second communication device through the transceiver;

wherein the first reference signal is used for an automatic gain control measurement of at least two ports of the first reference signal and at least one of the following of the at least two ports of the first reference signal:

a frequency offset estimation;

a channel state information measurement; or a channel estimation.

21. A communication device, the communication device being a second communication device and comprising a memory, a processor, a transceiver, and a computer program stored in the memory and executable on the processor; the processor executes the computer program to perform the signal processing method according to claim 10.

* * * * *